(12) United States Patent
Asakura et al.

(10) Patent No.: US 7,525,755 B2
(45) Date of Patent: *Apr. 28, 2009

(54) MAGNETIC RECORDING MEDIUM AND MAGNETIC RECORDING/REPRODUCING APPARATUS

(75) Inventors: Makoto Asakura, Tokyo (JP); Hideo Sado, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 157 days.

This patent is subject to a terminal disclaimer.

(21) Appl. No.: 11/750,848

(22) Filed: May 18, 2007

(65) Prior Publication Data

US 2007/0236822 A1 Oct. 11, 2007

Related U.S. Application Data

(62) Division of application No. 11/329,599, filed on Jan. 11, 2006, now Pat. No. 7,262,932.

(30) Foreign Application Priority Data

Jan. 12, 2005 (JP) .............................. 2005-005552

(51) Int. Cl.
*G11B 5/596* (2006.01)
(52) U.S. Cl. .................................. 360/77.08
(58) Field of Classification Search .............. 360/77.08, 360/77.06, 78.14, 53, 48, 64, 65, 17; 428/848.1; 375/373, 235, 354
See application file for complete search history.

(56) References Cited

U.S. PATENT DOCUMENTS

| 4,424,543 A | 1/1984 | Lewis et al. |
| 4,589,037 A | 5/1986 | Jen et al. |
| 4,669,004 A | 5/1987 | Moon et al. |
| 5,036,408 A * | 7/1991 | Leis et al. ..................... 360/48 |

(Continued)

FOREIGN PATENT DOCUMENTS

CN 1285947 A 2/2001

(Continued)

OTHER PUBLICATIONS

Japanese Office Action for Japanese Application No. 2005-005552 dated Mar. 13, 2007.

(Continued)

*Primary Examiner*—Fred Tzeng
(74) *Attorney, Agent, or Firm*—Amin, Turocy & Calvin, LLP

(57) ABSTRACT

A magnetic recording medium includes a servo area where servo data used for detecting a position of a magnetic head on a magnetic recording medium is recorded; and a writable data area, arranged side by side with the servo area in a track direction, on which user data is written by the magnetic head. The servo area includes a preamble area where a preamble recording pattern that represents data used for providing a clock synchronization of the servo data is formed by a plurality of magnetic sections; and a burst area where data used for detecting a relative position of the magnetic head with respect to a track center position of the servo data is recorded and on which a single burst recording pattern which is a layout pattern that tilts to the preamble recording pattern with a predetermined tilt angle is formed by a plurality of magnetic sections.

7 Claims, 23 Drawing Sheets

U.S. PATENT DOCUMENTS

| | | | |
|---|---|---|---|
| 5,545,836 A | 8/1996 | Reinehr et al. | |
| 6,094,318 A | 7/2000 | Kim | |
| 6,094,320 A | 7/2000 | Ahn | |
| 6,101,619 A | 8/2000 | Shin | |
| 6,297,926 B1 | 10/2001 | Ahn | |
| 6,529,341 B1 | 3/2003 | Ishida et al. | |
| 6,594,103 B1 | 7/2003 | Despain et al. | |
| 6,665,138 B1 | 12/2003 | Kim | |
| 6,738,205 B1 | 5/2004 | Moran et al. | |
| 6,961,203 B1 | 11/2005 | Baker | |
| 7,206,149 B2 | 4/2007 | Ozdemir | |
| 7,262,932 B2 | 8/2007 | Asakura et al. | |
| 7,298,576 B2 | 11/2007 | Asakura et al. | |
| 7,443,626 B2 * | 10/2008 | Asakura et al. | 360/64 |
| 2006/0050426 A1 | 3/2006 | Kaizu et al. | |
| 2006/0056091 A1 | 3/2006 | Nagano et al. | |
| 2006/0109579 A1 | 5/2006 | Asakura et al. | |
| 2006/0132953 A1 | 6/2006 | Asakura et al. | |
| 2006/0269791 A1 | 11/2006 | Okawa et al. | |
| 2006/0275692 A1 | 12/2006 | Okawa et al. | |
| 2006/0280974 A1 * | 12/2006 | Okino et al. | 428/848.1 |
| 2007/0217056 A1 | 9/2007 | Asakura et al. | |
| 2007/0217057 A1 | 9/2007 | Asakura et al. | |
| 2007/0217058 A1 | 9/2007 | Asakura et al. | |
| 2007/0223127 A1 | 9/2007 | Muruyama et al. | |
| 2007/0223133 A1 | 9/2007 | Asakura et al. | |
| 2007/0236822 A1 | 10/2007 | Asakura et al. | |
| 2007/0273992 A1 | 11/2007 | Kuroda | |

FOREIGN PATENT DOCUMENTS

| | | |
|---|---|---|
| JP | 61-214207 | 9/1986 |
| JP | 06-068623 | 3/1994 |
| JP | 06-231552 | 8/1994 |
| JP | 07-169032 | 7/1995 |
| JP | 07-230676 | 8/1995 |
| JP | 2000-322849 | 11/2000 |
| JP | 2001-202727 | 7/2001 |
| JP | 2001-243733 | 9/2001 |
| JP | 2003-016735 | 1/2003 |
| JP | 2003-016744 | 1/2003 |
| JP | 2003-123201 | 4/2003 |
| JP | 2003-338145 | 11/2003 |

OTHER PUBLICATIONS

Japanese Office Action dated Mar. 4, 2008 corresponding to U.S. Appl. No. 11/750,795, filed May 18, 2007.

Asakura, et al, U.S. Office Action dated Oct. 1, 2008 corresponding to U.S. Appl. No. 11/750,795, filed May 18, 2007.

Asakura, et al, U.S. Office Action dated Oct. 1, 2008 corresponding to U.S. Appl. No. 11/750,857, filed May 18, 2007.

Asakura, et al, U.S. Office Action dated Sep. 29, 2008 corresponding to U.S. Appl. No. 11/750,861, filed May 18, 2007.

Asakura, et al, U.S. Office Action dated Oct. 1, 2008 corresponding to U.S. Appl. No. 11/750,864, filed May 18, 2007.

Asakura, et al, U.S. Office Action dated Sep. 8, 2008 corresponding to U.S. Appl. No. 11/753;,039, filed May 24, 2007.

Chinese Office Action dated Aug. 17, 2007.

* cited by examiner

TRACK 302
301

TRACK 302
301

MAGNETIC RECORDING MEDIUM AND MAGNETIC RECORDING/REPRODUCING APPARATUS

CROSS-REFERENCE TO RELATED APPLICATIONS

This application claims the benefit of priority from and is a Division of application Ser. No. 11/329,599 filed on Jan. 11, 2006, which is based upon and claims the benefit of priority from the prior Japanese Patent Application No. 2005-005552, filed on Jan. 12, 2005; the entire contents of both applications are incorporated herein by reference.

BACKGROUND OF THE INVENTION

1. Field of the Invention

The present invention relates to a magnetic recording medium provided with a servo-area on which information used for positioning a magnetic head at a target position is recorded, and a magnetic recording/reproducing apparatus that carries out a reproducing process on such a magnetic recording medium.

2. Description of the Related Art

In a hard disk drive (HDD), a controlling process in which, upon positioning a magnetic head at a specified track, after the magnetic head has been allowed to seek for the specified track, a relative distance of the magnetic head from the center position of the track is found to position-determine the magnetic head on the track, needs to be carried out.

In order to carry out such a positioning control, servo data of a magnetic section recorded on a burst area in the servo-area of the magnetic recording medium is reproduced so that the positioning control of the magnetic head is carried out. The burst area is divided into bursts A, B, C and D made of magnetic sections recorded by four types of burst recording patterns having different positioning phases in the radius direction of the magnetic recording medium, and based upon an amplitude value of a reproduced signal generated when the magnetic head crosses each of the bursts A, B, C and D, positional deviation information indicating the relative distance of the magnetic head from the center position of the track is found so that the magnetic head is positioned at the track center position; thus, the positioning control is carried out.

In recent years, with respect to the magnetic recording medium, so-called patterned media in which servo-data to be recorded in a servo-area is embedded and formed as a magnetic section upon manufacturing the magnetic recording medium have received much attention.

In these pattern media, it is difficult to ensure the shape stability of the magnetic sections of the respective bursts A, B, C and D over the entire surface, and noise to a reproduced signal from the magnetic sections tends to increase to cause a difficulty in obtaining accurate position deviation information, causing the problem that there is a failure in positioning control for the magnetic head.

Moreover, upon manufacturing patterned media, in an attempt to stably carry out transferring and forming processes over the entire surface, it is preferable to reduce fluctuations in the ratio of irregularities of the magnetic section in the servo-area to a level as small as possible; however, within the servo-area, the ratio of irregularities becomes 50% in a preamble area and an address area while the ratio thereof becomes 25% in a burst area, with the result that it becomes difficult to manufacture a disk by carrying out transferring and forming processes over the entire surface.

In order to solve this problem, for example, Japanese Patent Application Laid-Open (JP-A) No. 7-169032 and JP-A No. 6-68623 have disclosed a technique, which, upon processing a reproduced signal of the servo-data, detects a phase difference of the reproduced signal of the servo-data. JP-A No. 6-231552, which relates to a process used for detecting position deviation information corresponding to a relative distance of the magnetic head from the track center position, discloses a technique in which: a phase difference of a reproduced signal from a burst area is detected and based upon the detected phase difference, position deviation information is found.

In the reproduced signal processing of this type utilizing a conventional phase difference detection, however, although the precision of the position deviation information can be improved, phases of reproduced signals from at least two types of burst recording patterns need to be detected. For this reason, in this conventional system, magnetic sections need to be recorded by using at least two types of different patterns in the burst area, causing the problem that the formatting efficiency of the magnetic recording medium deteriorates.

SUMMARY OF THE INVENTION

According to one aspect of the present invention, a magnetic recording medium includes a servo area where servo data used for detecting a position of a magnetic head on a magnetic recording medium is recorded; and a writable data area, arranged side by side with the servo area in a track direction, on which user data is written by the magnetic head. The servo area includes a preamble area where a preamble recording pattern that represents data used for providing a clock synchronization of the servo data is formed by a plurality of magnetic sections; and a burst area where data used for detecting a relative position of the magnetic head with respect to a track center position of the servo data is recorded and on which a single burst recording pattern which is a layout pattern that tilts to the preamble recording pattern with a predetermined tilt angle is formed by a plurality of magnetic sections.

According to another aspect of the present invention, a magnetic recording/reproducing apparatus includes a reproducing unit that performs a reproducing process on a magnetic recording medium that includes a servo area where servo data used for detecting a position of a magnetic head on the magnetic recording medium is recorded, and a writable data area, arranged side by side with the servo area in the track direction, on which user data is written by the magnetic head. The servo area includes a preamble area where a preamble recording pattern that represents data used for providing a clock synchronization of the servo data is formed by a plurality of magnetic sections, and a burst area where data used for detecting a relative position of the magnetic head with respect to a track center position of the servo data is recorded and on which a single burst recording pattern which is a layout pattern that tilts to the preamble recording pattern with a predetermined tilt angle is formed by a plurality of magnetic sections. The reproducing unit includes a phase detection unit that detects a phase difference of a burst reproduced signal of the burst area from a reproduced signal of the preamble area, based upon sample values at respective points in the preamble area, which are sampled by using a synchronous clock determined by a reproduced signal processing of the preamble area and a plurality of predetermined coefficients, as phase difference information corresponding to a plurality of phase differences; and a position detection unit that detects position deviation information indicating a relative distance of the magnetic head from the track center position based upon the phase difference information.

DETAILED DESCRIPTION OF THE INVENTION

Exemplary embodiments of a magnetic recording medium and a magnetic recording/reproducing apparatus according to the present invention will be described in detail with reference to the accompanying drawings.

Figure 1:
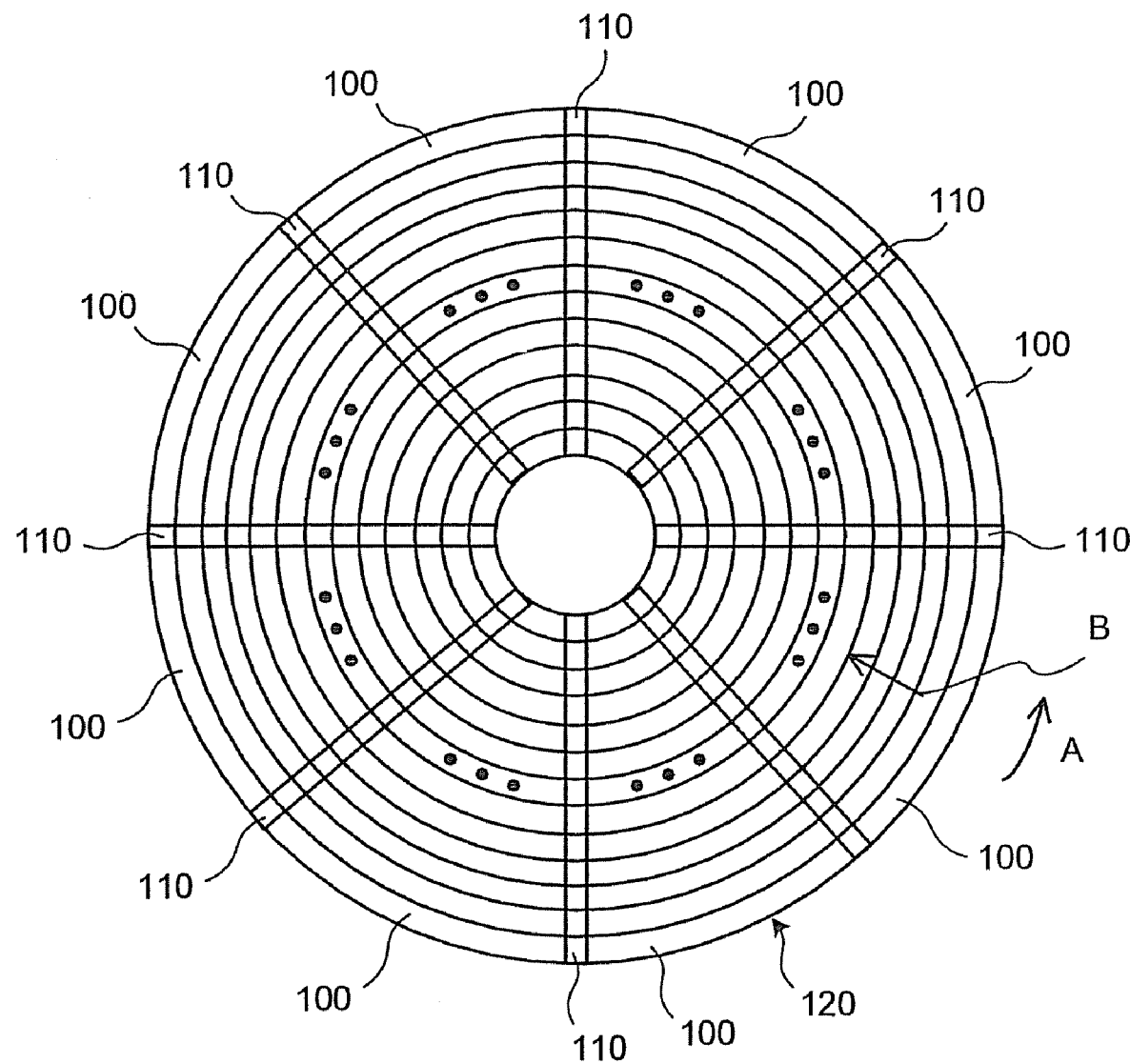
FIG. 1 is a schematic diagram that shows a structure of a magnetic recording medium according to a first embodiment.

FIG. 1 is a schematic view that shows a structure of a magnetic recording medium according to a first embodiment. FIG. 1 shows the magnetic recording medium viewed from above. As shown in FIG. 1, a plurality of tracks 120 is formed on concentric circles on the magnetic recording medium. Each of the tracks is divided into a plurality of data areas 100 by a plurality of servo-areas 110 that are virtually formed into a substantially radial format.

The data area 100 forms an area on which user data can be written by a magnetic head of a magnetic recording medium reproducing device. The servo-area 110 is an area on which servo data that allows the magnetic head of the magnetic recording medium reproducing device to detect a position on the magnetic recording medium has been preliminarily formed.

Here, the track direction of the magnetic recording medium refers to an array direction of sectors in which the sector address increases in one track, and corresponds to arrow A direction shown in FIG. 1 in the magnetic recording medium according to the present embodiment.

Addresses are assigned to each of the data areas as physical sectors 0 to N in succession in the track direction. In FIG. 1, for convenience of explanation, an 8-sector structure with N=7 is shown; however, in actual cases, a structure with N>100 or more is used.

Moreover, the radial direction of the magnetic recording medium refers to a direction toward the center along the radius from the peripheral edge of the magnetic recording medium, and in the magnetic recording medium of the present embodiment, the radial direction corresponds to the width direction of the track that is arrow B direction shown in FIG. 1.

In the magnetic recording medium of the present embodiment, the track width of the servo-area and the track width of the data area are formed so as to be identical to each other.

Here, not limited to this structure, the track width of the servo-area 110 may be designed to be ⅔ of the track width of the data area 100.

Figure 2:
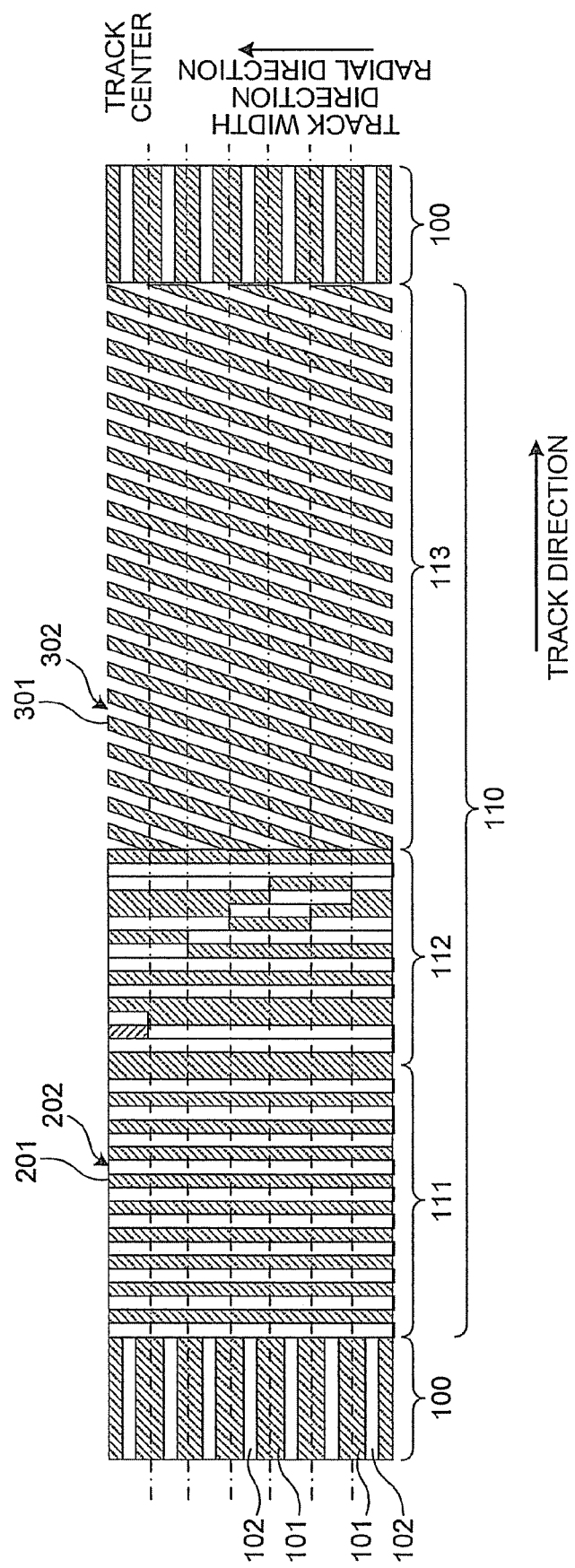
FIG. 2 is a schematic diagram that shows a structure centered on a servo-area of the magnetic recording medium of the first embodiment.

FIG. 2 is a schematic diagram that shows a structure mainly composed of the servo-areas 110 of the magnetic recording medium according to the first embodiment. As shown in FIG. 2, the magnetic recording medium of the present embodiment has a structure in which the data areas 100 are arranged side by side in the track direction of each of the servo areas 110. Here, in FIG. 2, a broken line indicates the centerline of each track.

The data area 100 is provided with a plurality of tracks having magnetic bands 101 that allow the magnetic head to write user data thereon, with a non-magnetic band 102 on which no user data is writable being placed between adjacent tracks. In other words, the magnetic recording medium of the present embodiment forms a discrete track-type recording medium in which the magnetic bands 101 are physically separated by the non-magnetic band 102.

The servo-area 110 is provided with magnetic sections 201 and 302 as well as non-magnetic sections 202 and 302 that are formed thereon through an entire-surface transferring process by a stamper upon manufacturing the magnetic recording medium, and the non-magnetic sections 202 and 302 have a structure filled with a non-magnetic material. Upon reproducing servo data from the servo-area 110 by the magnetic head of the magnetic recording/reproducing apparatus, the magnetic sections 201 and 302 are reproduced as a binary value "1," and the non-magnetic sections 202 and 302 are reproduced as a binary value "0."

As shown in FIG. 2, the servo-area 110 is constituted by a preamble area 111, an address area 112 and a burst area 113. Here, the magnetic sections 201 and 302 may be formed through the entire-surface transferring process by a stamper at the time of manufacturing the magnetic recording medium, or may be preliminarily recorded and formed by using a servo track writer (STW).

In the magnetic recording medium of the present embodiment, the non-magnetic band 102 and the non-magnetic sections 202 and 302 have a structure, which is filled with a non-magnetic material; however, in place of the structure filled with a non-magnetic material, a structure in which non-magnetic sections 202 and 302 are prepared as voids may be adopted.

The preamble area 111 is an area in which, among pieces of data, data used for conducting a clock synchronizing process is recorded, and magnetic sections 201 and non-magnetic sections 202 are formed in response to codes ("1" and "0") of such data. The preamble area 111 is read by the magnetic head prior to an address area 112 and a burst area 113, and used for a PLL (Phase Lock Loop) process that is used for synchronizing a clock of a data reproduced signal in response to a time deviation caused by a rotation eccentricity or the like of the magnetic recording medium as well as for an AGC (Auto Gain Control) that is used for appropriately maintaining an amplitude of the reproduced signal.

The preamble area 111 is prepared as a linear form in which a plurality of the magnetic sections 201 are placed so as to extend in the track width direction (arrow B direction in FIG. 1, that is, perpendicular direction in FIG. 2) that is perpendicular to the track direction so that the same reproduced signal is obtained from data whichever track position the magnetic head of the magnetic recording/reproducing apparatus is located in, and the magnetic sections 201 are recorded as a preamble recording pattern in which the magnetic sections 201 are arranged in the track direction with a non-magnetic section having the same width being interpolated there between.

The address area 112 is an area in which codes referred to as servo marks indicating the start of the servo-area 110 and data formed by sector information, cylinder information and the like represented by a Manchester encoding system, and the magnetic sections 201 and the non-magnetic sections 202 are formed in accordance with codes ("1" and "0") of such data. Here, the cylinder information is recorded in a manner so as to allow the value to vary for each of the tracks by a unit of 100 servo-areas.

Figure 3A:
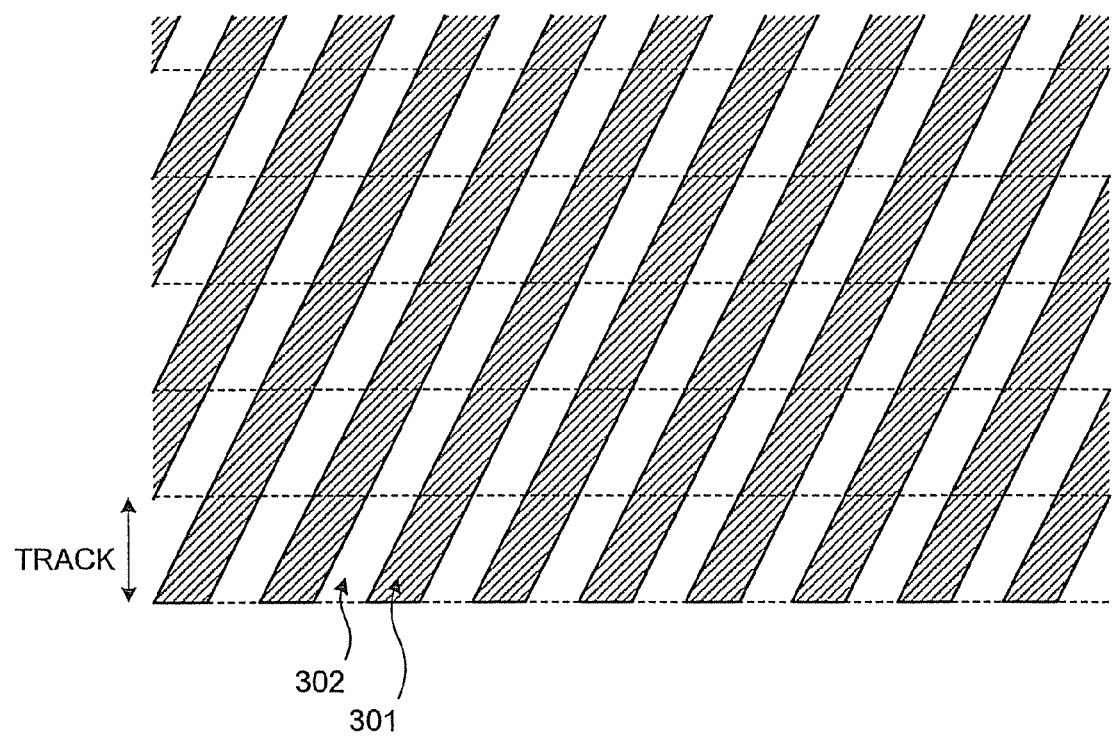
FIG. 3A is an enlarged schematic diagram that shows a burst area of the magnetic recording medium of the first embodiment, and corresponds to an enlarged view of the burst area in a mode in which a magnetic section tilts with an angle corresponding to one cycle of a phase of a burst reproduced signal for each of changes in two tracks of cylinder information.

The burst area 113 is an area in which data used for detecting position deviation information that corresponds to the relative position of the magnetic head to the track center position is recorded, and the magnetic sections 301 and non-magnetic sections 302 are formed in accordance with codes ("1" and "0") of such data. FIG. 3A is an enlarged schematic diagram that shows the burst area of a magnetic recording medium according to the first embodiment.

The burst area 113 of the magnetic recording medium of the present embodiment is provided with a plurality of magnetic sections 301 formed by a single burst recording pattern that is an array pattern that tilts with a predetermined tilt angle to the preamble recording pattern of the preamble area 111. In other words, the magnetic sections 301 of the burst area 113 are linearly arranged in a tilted manner with a predetermined tilt angle to the radial direction (perpendicular direction in FIG. 2) of the magnetic recording medium along which the respective magnetic sections 201 are placed in a preamble recording pattern of the preamble area 111, and formed by a burst recording pattern that is arranged in the track direction with a non-magnetic section 302 having the same width as the magnetic section 301 being interpolated there between. Moreover, different from a burst area for a conventional magnetic recording medium in which magnetic sections are recorded by four kinds of burst recording patterns having different array phases in the radial direction, such as burst A, burst B, burst C and burst D, the burst area 113 of the present embodiment is provided with a plurality of magnetic sections 301 formed thereon by using a tilted single burst recording pattern. Here, the magnetic sections 301 may be formed in a tilted linear form as a whole as a result of manufacturing processes of the magnetic recording medium, and may also be formed in a linear shape containing a fine shape of steps.

Since the burst recording pattern of the magnetic sections 301 in the burst area 113 is formed in a tilted manner with respect to the direction of the magnetic sections 201 of the preamble area 111, the rising phase timing of the reproduced signal from the magnetic sections 301 deviates as the magnetic head is shifted in the radial direction. As shown in FIG. 3A, the tilt angle of the magnetic sections 301 is defined as an angle that allows the phase of the burst reproduced signal to form one cycle for every two track changes of cylinder information of the address area 112.

Figure 3B:
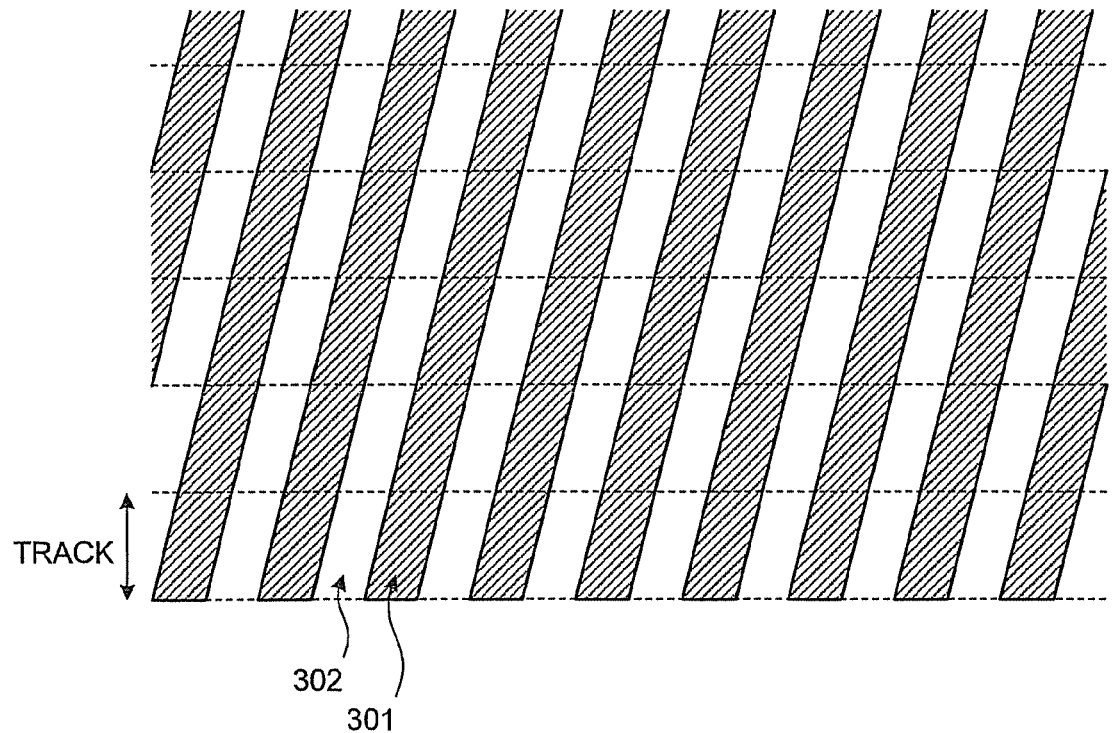
FIG. 3B is an enlarged schematic diagram that shows a burst area of the magnetic recording medium in another mode of the first embodiment, and corresponds to an enlarged view of the burst area in a mode in which a magnetic section tilts with an angle corresponding to one cycle of a phase of a burst reproduced signal for each of changes in four tracks of cylinder information.

Here, in the burst area 113 of the magnetic recording medium according to the present embodiment, not limited to two tracks of cylinder information of the address area 112, the tilted angle of the magnetic sections 301 that forms one cycle of the phase of the reproduced signal for data can be set within a range from two tracks or more to 4 tracks or less to obtain a sufficient amplitude value of the reproduced signal, without causing a reduced tilted angle. FIG. 3B is a schematic view that shows a structure of the burst area 113 in which the magnetic sections 301 are recorded by using a burst recording pattern that defines the tilted angle of the magnetic sections 301 as an angle that allows the phase of the burst reproduced signal to form one cycle for every four track changes.

Here, the one cycle in the track direction of the magnetic sections 301 of the burst recording pattern is identical to the cycle of the magnetic sections 201 in the preamble area and address area. For this reason, when the magnetic head is shifted from the preamble area 111 to the burst area 113, in synchronized timing with the clock cycle that is determined as the sampling timing from the reproduced signal from the preamble area 111, the sampling of the reproduced signal from the burst area 113 can be carried out so that a phase detection is achieved.

Figure 4:
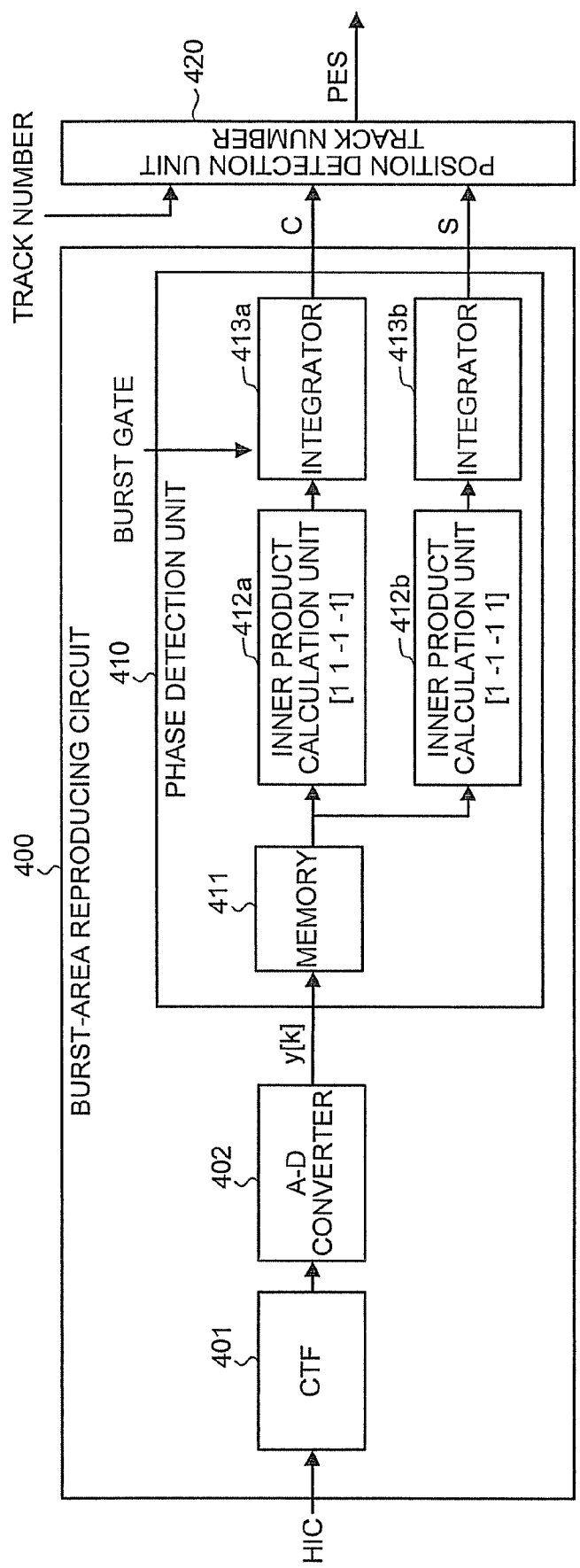
FIG. 4 is a block diagram that shows a structure of a burst-area reproducing circuit of a magnetic recording/reproducing apparatus according to the first embodiment.

Next, the following description will discuss a burst-area reproducing circuit of a magnetic recording/reproducing apparatus that reproduces the magnetic recording medium of the present embodiment. FIG. 4 is a block diagram that shows a structure of the burst-area reproducing circuit of the magnetic recording/reproducing apparatus according to the first embodiment.

As shown in FIG. 4, the burst-area reproducing circuit 400 of the present embodiment is mainly constituted by a CTF 401, an A-D converter 402 and a phase detection unit 410.

The CTF (Continuous Time Filter) 401 carries out a filtering process on an analog reproduced signal reproduced from the input burst area 113 through an LPF (Low Pass Filter) or the like.

The A-D (Analog-Digital) converter 402 converts an analog signal outputted from the CTF 401 into a digital burst reproduced signal in synchronized timing with the same clock as the synchronous clock of a reproduced signal outputted by a PLL (Phase-Locked Loop) circuit (not shown) in the reproduced signal processing in the preamble area 111 so that the sample value is stored in a memory 411 of the phase detection unit 410. Here, in the present embodiment, four points are sampled from an analog signal of the burst reproduced signal of one cycle, and the sample values at the four points are stored in the memory 411.

Based upon the sample values at the four points of the burst reproduced signal sampled by the A-D converter 402, the phase detection unit 410 detects a phase difference to find a phase difference cosine value C and a phase difference sine value S of a phase difference of the burst reproduced signal from the synchronous clock, and BstAB obtained by integrating the phase difference cosine value C and BstCD obtained by integrating the phase difference sine value S are outputted, while the output timing is being switched.

As shown in FIG. 4, the phase detection unit 410 is provided with a memory 411, two inner product calculation units 412a and 412b and two integrators 413a and 413b.

The memory 411 stores sample values of four points in one cycle that have been sampled by the A-D converter 402.

Figure 5A:
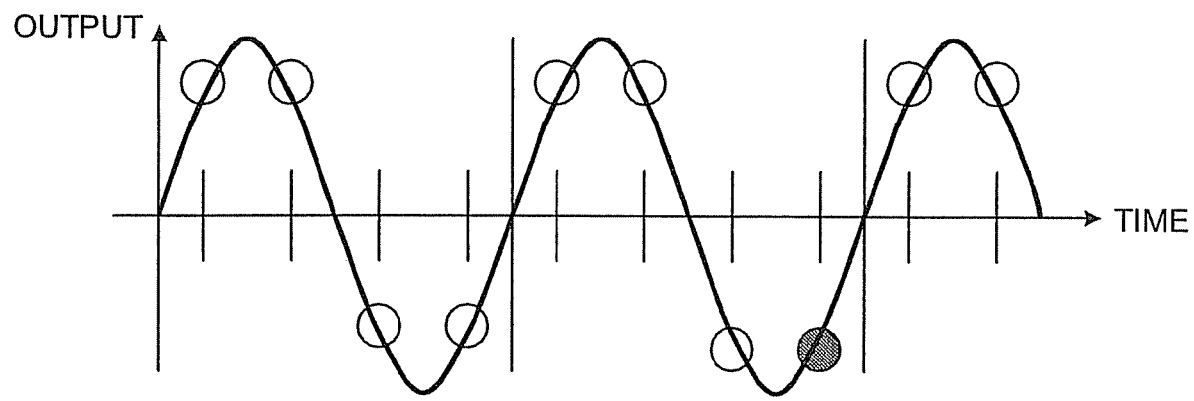
FIG. 5A is an explanatory view that shows a burst reproducing signal at phase H0=0 and a sampling point.
Figure 5B:
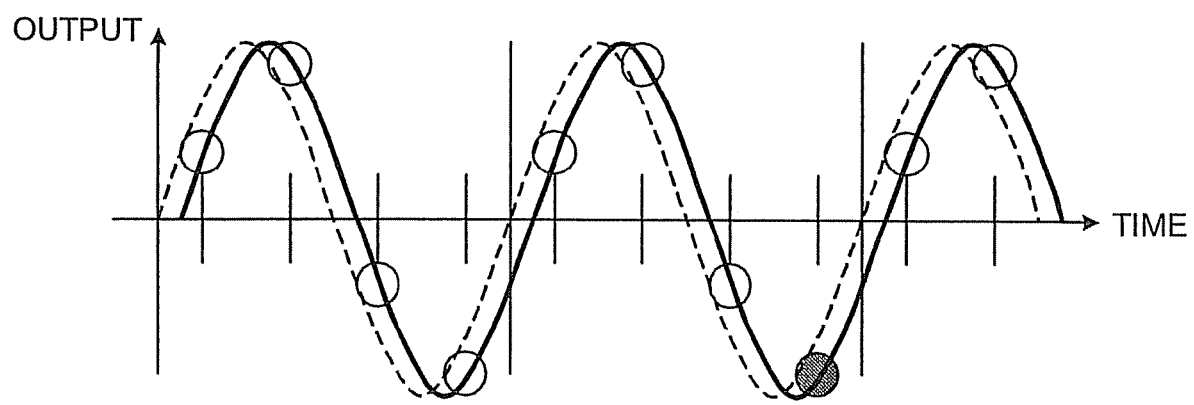
FIG. 5B is an explanatory view that shows a burst reproducing signal at phase H0 and a sampling point.

FIG. 5A is an explanatory view that indicates a burst reproduced signal and sample points with a phase H0=0. Here, FIGS. 5A and 5B show burst reproduced signal waveforms from the burst areas of tracks having even track numbers. Here, a burst reproduced signal from the burst areas of tracks having odd track numbers forms a waveform obtained by inverting the phase of each of waveforms of FIGS. 5A and 5B by 180 degrees.

The sampling values at four points, sampled from the burst reproduced signal by the A-D converter 402 can be approximated by equation (1):

$$y(k)=G0*\sin(2\pi k/N+H0+\pi/N) \quad (1)$$

N=4, k=0, 1, 2, 3 where G0 is an amplitude, and H0 is a phase difference.

Sample values at four points are converted into vectors for each cycle, and outputted to the memory 411 in a manner as shown in equation (2):

$$Y=[y(0),y(1),y(2),y(3)]^t \quad (2)$$

Here, y(0), y(1), y(2) and y(3) of equation (2) are calculated based upon equation (1), and indicated by equations (3) to (6):

$$y(0)=G0*\sin(\pi/4+H0) \quad (3)$$

$$y(1)=G0*\sin(3\pi/4+H0) \quad (4)$$

$$y(2)=G0*\sin(5\pi/4+H0) \quad (5)$$

$$y(3)=G0*\sin(7\pi/4+H0) \quad (6)$$

The output Y from the memory 411 at the time of the phase H0=0 shown in FIG. 5A is indicated by equation (7) by calculating equations (3) to (6) with H0=0 being held:

$$Y\approx(\sqrt{2}/2)*G0*[1,1,-1,1]^t \quad (7)$$

Here, ≈ is used because the actual sample value has an error from an ideal value due to influences from noise.

An inner product calculation unit 412a reads sample values Y at four points for each cycle from the memory 411, and calculates the inner product of the sample value Y and each of cosine value detecting coefficients [1, 1, −1, −1] so that a phase difference cosine value C is outputted. An inner product calculation unit 412b reads sample values Y at four points from the memory 411, and calculates the inner product of the sample value Y and each of sine value detecting coefficients [1, −1, −1, 1] so that a phase difference sine value S is outputted.

Here, the cosine value detecting coefficients [1, 1, −1, −1] are sine values with phase difference 0, and the sine value detecting coefficients [1, −1, −1, 1] are cosine values with phase difference 0.

The phase difference cosine value C calculated by the inner product calculation unit 412a and the phase difference sine value S calculated by the inner product calculation unit 412b are represented by equations (8) and (9), when the inner products between the sample values Y indicated by equations (2) to (6) and the cosine value detecting coefficients [1, 1, −1, −1] as well as the sine value detecting coefficients [1, −1, −1, 1] are calculated.

$$C=2\sqrt{2}*G0*\cos(H0) \quad (8)$$

$$S=2\sqrt{2}*G0*\sin(H0) \quad (9)$$

An integrator 413a sequentially integrates the phase difference cosine value C found in the inner product calculation unit 412a, and an integrator 413b sequentially integrates the phase difference sine value S found in the inner product calculation unit 412b; thus, noise from each of the values is suppressed, and the resulting signal is outputted as phase difference information. With this arrangement, two kinds of phase difference information, that is, the phase difference sine value and the phase difference cosine value, corresponding to an off-track phase difference required for orthogonal wave detection are obtained.

A position detection unit 420 to which the phase difference cosine value C, the phase difference sine value S and the track number are inputted is used for detecting positional deviation information that indicates a relative distance of the magnetic head from the track center.

Figure 6:
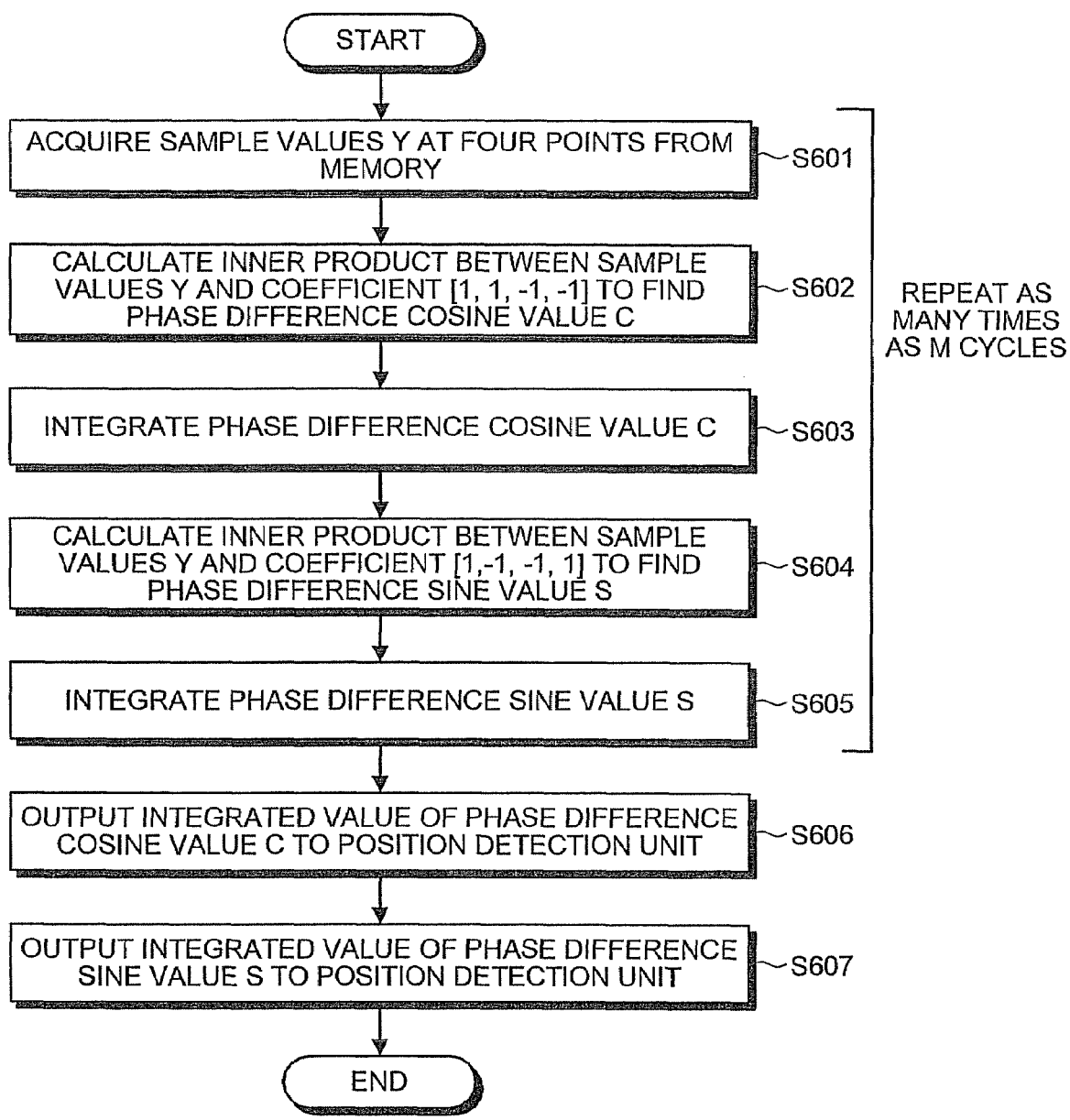
FIG. 6 is a flow chart that shows a sequence of burst-area reproducing processes carried out by a burst-area reproducing circuit according to the first embodiment.

Next, the following description will discuss a burst area reproducing process to be carried out by the burst-area reproducing circuit 400 according to the present embodiment having the structure as described above. FIG. 6 is a flow chart that shows a sequence of the burst area reproducing processes by the burst-area reproducing circuit of the first embodiment.

When, after having passed over the preamble area 111 of the servo area 110 and the address area 112 and having been shifted to a target track, the magnetic head reaches the burst area 113, a burst gate, which gives a period in which a burst signal reproducing process is carried out, is allowed to rise. Then, a burst reproduced signal is read from the burst area 113 through the magnetic head so that the analog reproduced signal thus read is sent to the CTF 401. The CTF 401 carries out a filtering process on the analog reproduced signal, and inputs the resulting signal to the A-D converter 402. In the A-D converter 402, the reproduced signal is sampled in synchronized sample timing with a synchronous clock determined in the reproduced signal processing of the preamble area so that sample values Y at four points for each cycle are stored in the memory 411 of the phase detection unit 410.

The inner product calculation unit 412a and the inner product calculation unit 412b of the phase detection unit 410 acquire the sample values Y at four points from the memory 411 (step S601).

The inner product calculation unit 412a calculates the inner product between the acquired sample values Y and the cosine value detecting coefficients [1, 1, −1, −1] to find a phase difference cosine value C (step S602). This phase difference cosine value C is indicated by equation (8), and the resulting value is outputted to the integrator 413a. The integrator 413a sequentially integrates the inputted phase difference cosine value C (step S603).

In contrast, the inner product calculation unit 412b calculates the inner product between the acquired sample values Y and the sine value detecting coefficients [1, −1, −1, 1] to find a phase difference sine value S (step S604). The integrator 413a sequentially integrates the inputted phase difference cosine value C (step S603). This phase difference sine value S is indicated by equation (9), and the resulting value is outputted to the integrator 413b. The integrator 413b sequentially integrates the inputted phase difference sine value S (step S605).

Moreover, the processes from the steps S601 to S605 are repeatedly carried out as many times as M cycles included in the interval of the burst gate. With respect to the M cycles, all the cycles of the magnetic sections 301 of the burst area 112 (21 cycles in the example of FIG. 2) may be included therein; however, this process causes a distortion in the reproduced signal at the start position of the burst area 113, and in order to avoid this problem, preferably, after a lapse of time corresponding to two cycles since the start of the reproducing process in the burst area 113, the burst gate is allowed to rise, and the burst gate is allowed to fall one cycle before the end position of the burst area 113. For this reason, in the example of the magnetic recording medium of FIG. 2, during the period corresponding to M=21 cycles, the burst gate is kept in the raised state so that the processes from step S601 to S605 are repeated.

Upon completion of integrating processes of the phase difference cosine value C corresponding to M cycles by the integrator 413a, the integrated value BstAB of the phase difference cosine value C is outputted to the position detection unit 420 (step S606). In contrast, upon completion of integrating processes of the phase difference sine value S corresponding to M cycles by the integrator 413b, the integrated value BstCB of the phase difference sine value S is outputted to the position detection unit 420 (step S607).

Figure 7A:
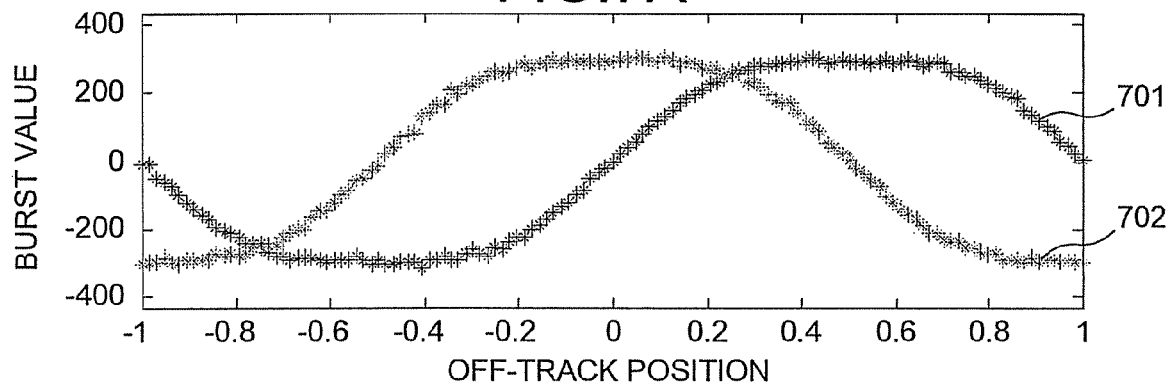
FIG. 7A is a graph that shows a state of a change due to an off-track position of the center of a magnetic head from the center of a track, which is given by integrated value BstAB of a phase difference cosine value C and integrated value BstCD of a phase difference sine value S.

FIG. 7A is a graph that shows a state of a change due to an off-track position of the center of a magnetic head from the center of a track, which is given by integrated value BstAB of a phase difference cosine value C and integrated value BstCD of a phase difference sine value S (BstAB and BstCD are referred to as burst values).

In FIG. 7A, reference numeral 702 indicates the burst value BstAB and 701 indicates the burst value BstCD. Actually, the waveform of the burst reproduced signal causes a waveform distortion, failing to form an ideal since waveform indicated by equation (1). For this reason, FIG. 7A indicates that the burst values BstAB and BstCD also cause no sine-wave fluctuations with respect to the off-track position; however, BstCD is allowed to virtually linearly change with respect to the off-track position in the vicinity of the track center, and BstAB is allowed to virtually lineally change at a position offset by 0.5 track (offset track position=position indicated by 0.5, −0.5). Consequently, it becomes possible to detect position deviation information corresponding to the off-track position with high precision from the burst values BstAB and BstCD.

Therefore, the position detection unit 420 finds a weighted average obtained by multiplying the inputted BstAB and BstCD by a weighting coefficient preliminarily obtained based upon the graph of FIG. 7A. In this case, as described above, since the phases of waveforms of burst reproduced signals are inverted by 180 degrees between the reproduced signal from an even track and the reproduced signal from an odd track, the track number CYL is inputted, and depending on whether the track number is an even number or an odd number, the phases of BstAB and BstCD are inverted to find the weighted average so that a smoothing process is carried out to find position deviation information PES.

In addition to this, the position detection unit 420 may be designed to find position deviation information BES by using another method such as finding arc-tangent arctan (BstAB/BstCD) of BstAB and BstCD.

Figure 7B:
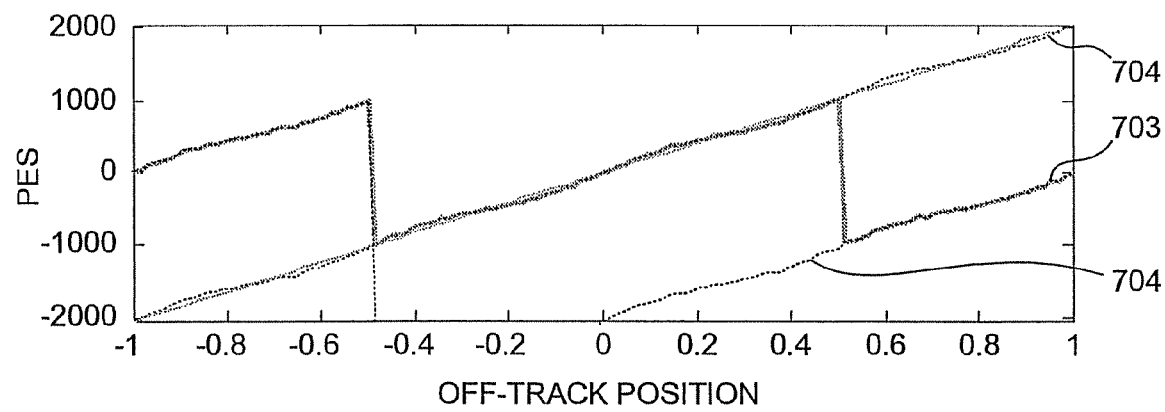
FIG. 7B is a graph that shows position deviation information PES in association with each of track addresses.

FIG. 7B is a graph that shows position deviation information PES with respect to each track address. A solid line 703 indicates position deviation information, and a wave line 704 indicates a deviation along an odd track as well as along an even track.

As described above, according to the magnetic recording medium of the first embodiment, a plurality of magnetic sections 301 are recorded on the burst area 113 by using a single burst recording pattern that tilts to a preamble recording pattern of magnetic sections 201 of the preamble area 111 with a predetermined angle; therefore, in comparison with a conventional magnetic recording medium in which the burst area is constituted by a plurality of different burst recording patterns, it becomes possible to improve the formatting efficiency of the magnetic recording medium. Moreover, a plurality of magnetic sections 301 are recorded by using a single burst recording pattern that tilts to the preamble recording pattern with a predetermined angle; therefore, when the magnetic head scans the burst area 113, the phase of the burst reproduced signal is allowed to change so that by detecting this phase change, position deviation information of the magnetic head from the track center position can be found with high precision.

Moreover, in the magnetic recording/reproducing apparatus according to the first embodiment, phase difference information of the burst reproduced signal to the preamble reproduced signal is found from the sample value of the burst reproduced signal so that the position deviation information of the magnetic head is found; therefore, even when the burst area 113 is constituted by a single burst recording pattern that tilts, as in the case of the magnetic recording medium of the present embodiment, it becomes possible to detect positional deviation information with high precision.

A second embodiment according to the present invention will be explained below.

In a magnetic recording/reproducing apparatus according to the second embodiment, a burst gate is divided into a plurality of gates in a burst-area reproducing circuit so as to process a reproduced signal from a burst area 113.

In the same manner as the first embodiment, the magnetic recording medium of the present embodiment has a structure in which magnetic sections 301 of the burst area 113 are formed as a single burst recording pattern that tilts to a preamble recording pattern. In the present embodiment, a track width of a serve-area 110 is set to ⅔ of the track width of a data area. However, the magnetic recording medium of the first embodiment may be used for a magnetic recording/reproducing apparatus of the present embodiment.

Figure 8:
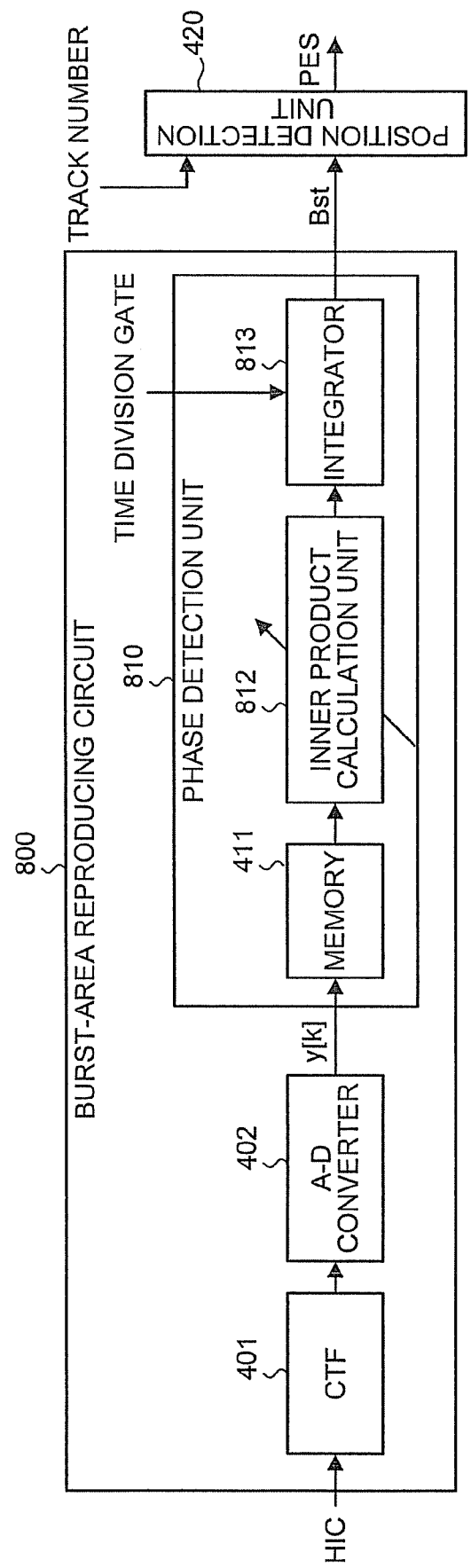
FIG. 8 is a block diagram that shows a structure of a burst-area reproducing circuit of a magnetic recording/reproducing apparatus according to a second embodiment.

FIG. 8 is a block diagram that shows a structure of a burst-area reproducing circuit 800 of a magnetic recording/reproducing apparatus according to the second embodiment. As shown in FIG. 8, the burst-area reproducing circuit 800 of the present embodiment is mainly constituted by a CTF 401, an A-D converter 402 and a phase detection unit 810. The CTF 401 and the A-D converter 402 have the same functions as those of the CTF 401 and the A-D converter 402 of the burst-area reproducing circuit 400 of the first embodiment.

In the phase detection unit 810, the burst gate is divided into four gates, and for each of the divided gates, a burst value is found as phase difference information from sample values at four points of a burst reproduced signal stored in the memory 411 by using the A-D converter 402, and the resulting value is outputted to the position detection unit 420.

As shown in FIG. 8, the phase detection unit 810 is constituted by the memory 411, an inner product calculation unit 812 and an integrator 813.

In the same manner as the first embodiment, the memory 411 stores sample values at four points for each cycle sampled by the A-D converter 402.

The inner product calculation unit 812 calculates inner products between sample values at four points and coefficients on a gate basis, while switching coefficients for each of the divided gates. Different from the first embodiment, the present embodiment has a structure in which: the burst gate is divided into four equal portions to provide intervals of gate A, gate B, gate C and gate D, and for each of the gate intervals, the inner product coefficient by which the sample values Y at four points are multiplied is switched and made different from each other.

Since the burst area of a conventional magnetic recording medium is formed by a burst recording pattern that is divided into burst A, burst B, burst C and burst D, each of reproduced signals from the burst sections is obtained as a reproduced signal with a phase difference H0=0 indicated by FIG. 5A, with the result that the amplitude value G0 fluctuates in each of the burst sections. By adopting [1, 1, −1, −1] as inner product coefficients for the sample values at four points for one cycle, the inner product value C is obtained from equation (8) so that the value corresponding the amplitude, that is, the value in proportion to the amplitude, is obtained. Here, actually, in order to suppress noise, the inner product values corresponding to a plurality of frequencies are integrated and by using the average amplitude, the respective burst values of burst A, burst B, burst C and burst D are found.

In the present embodiment, however, since the burst area 113 of the magnetic recording medium is formed as a tilted single burst recording pattern as shown in FIG. 3A, the amplitude obtained from the reproduced signal is always made constant. For this reason, in the burst-area reproducing circuit 800 of the present embodiment, the burst gate is divided into four equal portions to prepare intervals of gate A, gate B, gate C and gate D, and for each of the gate intervals, the inner product coefficient by which the sample values Y at four points are multiplied is switched and made different from each other so that different amplitude values are obtained.

Figure 9:
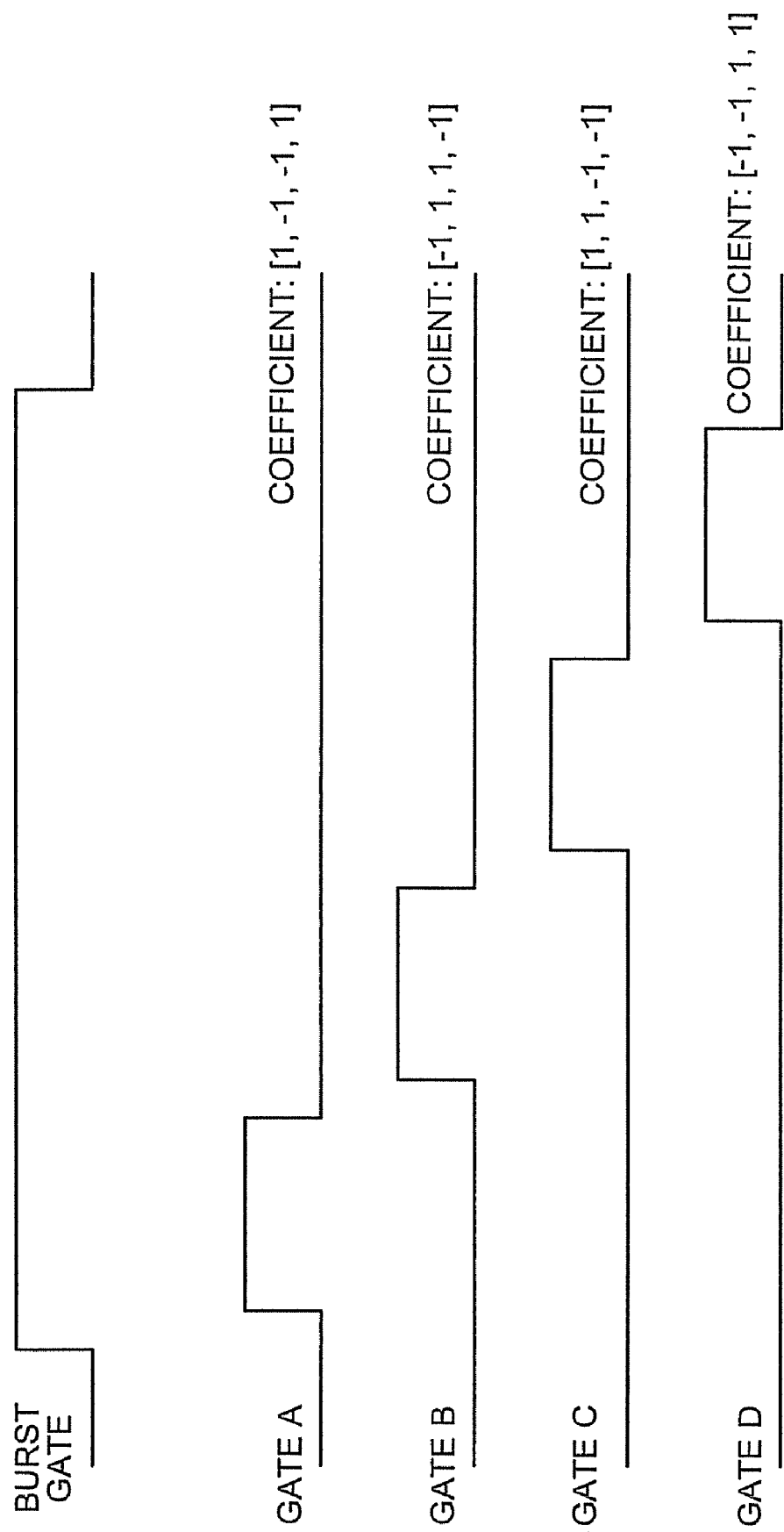
FIG. 9 is an explanatory view that shows a state in which inner product coefficients are switched for each of divided gates of burst gates.

FIG. 9 is an explanatory view that shows a state in which inner product coefficients are switched for each of divided gates of the burst gate. As shown in FIG. 9, gate A uses the inner product coefficients [1, −1, −1, 1], gate B uses the inner product coefficients [−1, 1, 1, −1], gate C uses the inner product coefficients [1, 1, −1, −1] and gate D uses the inner product coefficients [−1, −1, 1, 1], in a switched manner so that the inner products relating to the sample values Y at four points are found.

The integrator 813 sequentially integrates the inner product values found in the inner product calculation unit 812 for each of the gates in a manner so as to suppress noise, and the resulting integrated value is outputted to the position detection unit 420 as the burst value (phase difference information).

In this manner, even in the case when a plurality of magnetic sections 301 in the burst area 113 are formed by a single burst recording pattern tilted to the preamble recording pattern, since the burst value corresponding to each of the divided gates is obtained; therefore, the position detection unit 420 is allowed to detect the position of the magnetic head by using the same processes as those of the magnetic recording medium having a burst area formed by four kinds of burst recording patterns in the functions and structure of the conventional position detection unit 420 that detects position deviation information from reproduced signals derived from conventional divided four burst areas of burst A, burst B, burst C and burst D.

Figure 10:
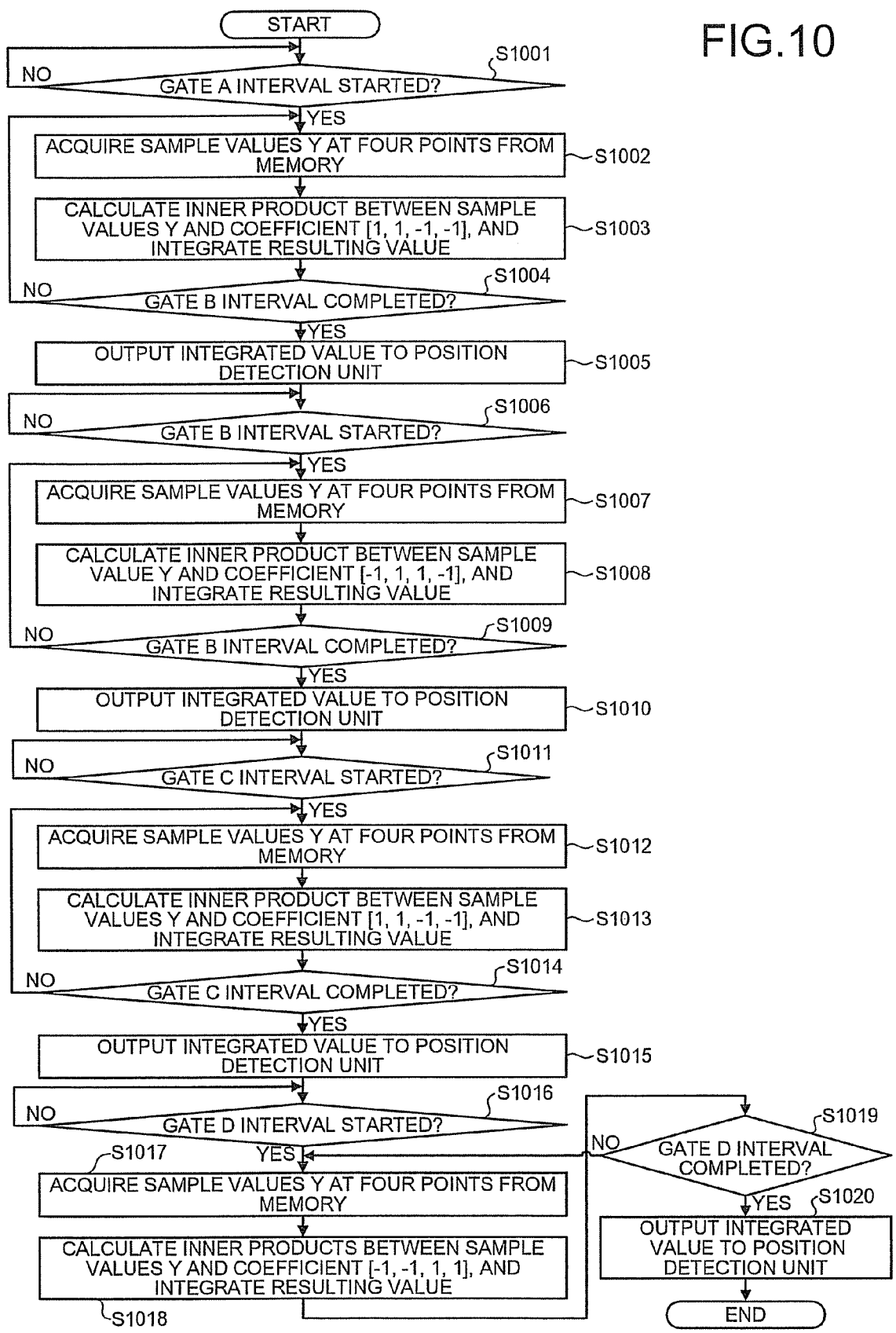
FIG. 10 is a flow chart that shows a sequence of burst-area reproducing processes according to the second embodiment.

The following description will discuss a burst area reproducing process to be carried out by the burst-area reproducing circuit 800 according to the present embodiment having the structure as described above. FIG. 10 is a flow chart that shows a sequence of the burst area reproducing processes according to the second embodiment.

When, after having passed over the preamble area 111 of the servo area 110 and the address area 112 and having been shifted to a target track, the magnetic head reaches the burst area 113, a burst gate gives a period in which a burst signal reproducing process is carried out, and in this embodiment, the burst gate is divided into equal portions, that is, gate A, gate B, gate C and gate D. In the same manner as the first embodiment, a burst reproduced signal is read from the burst area 113 through the magnetic head so that the analog reproduced signal thus read is sent to the CTF 401. The CTF 401 carries out a filtering process on the analog reproduced signal, and inputs the resulting signal to the A-D converter 402. In the A-D converter 402, the reproduced signal is sampled in synchronized sample timing with a synchronous clock determined in the reproduced signal processing of the preamble area so that sample values Y at four points for each cycle are stored in the memory 411 of the phase detection unit 810.

In the phase detection unit 810, when the gate A interval is started (Yes: at step S1001), the inner product calculation unit 812 acquires the sample values Y at four points from the memory 411 (step S1002). The inner product calculation unit 812 calculates the inner product by multiplying the acquired sample values Y by the inner product coefficients [1, 1, −1, −1] corresponding to the gate A interval and the resulting value is sequentially integrated by the integrator 813 (step S1003). These processes of steps S1002 and S1003 are repeated until the gate A interval has been completed (step S1004: No). With this arrangement, the integrator 813 integrates the inner product value calculated during the gate A interval.

Upon completion of the gate A interval (Yes: step S1004), the value integrated in the integrator 813 is sent to the position detection unit 420 as a burst value Bst (phase difference information) (step S1005).

When the gate B interval is started (Yes: at step S1006), the inner product calculation unit 812 acquires the sample values Y at four points from the memory 411 (step S1007), and calculates the inner product by multiplying the acquired sample values Y by the inner product coefficients [−1, 1, 1, −1] corresponding to the gate B interval and the resulting value is sequentially integrated by the integrator 813 (step S1008). These processes of step S1007 and S1008 are repeated until the gate B interval has been completed (step S1009: No). With this arrangement, the integrator 813 integrates the inner product value calculated during the gate B interval.

Upon completion of the gate B interval (Yes: step S1009), the value integrated in the integrator 813 is sent to the position detection unit 420 as a burst value Bst (phase difference information) (step S1010).

In the same manner, when the gate C interval is started (Yes: at step S1011), the inner product calculation unit 812 acquires the sample values Y at four points from the memory 411 (step S1012), and the inner product calculation unit 812 calculates the inner product by multiplying the acquired sample values Y by the inner product coefficients [1, 1, −1, −1] corresponding to the gate C interval and the resulting value is sequentially integrated by the integrator 813 (step S1013). These processes of step S1012 and S1013 are repeated until the gate C interval has been completed (step S1014: No).

Upon completion of the gate C interval (Yes: step S1014), the value integrated in the integrator 813 is sent to the position detection unit 420 as a burst value Bst (phase difference information) (step S1015).

In the same manner, when the gate D interval is started (Yes: at step S1016), the inner product calculation unit 812 acquires the sample values Y at four points from the memory 411 (step S1017), and the inner product calculation unit 812 calculates the inner product by multiplying the acquired sample values Y by the inner product coefficients [−1, −1, 1, 1] corresponding to the gate D interval and the resulting value is sequentially integrated by the integrator 813 (step S1018). These processes of step S1017 and S1018 are repeated until the gate D interval has been completed (step S1019: No).

Upon completion of the gate D interval (Yes: step S1019), the value integrated in the integrator 813 is sent to the position detection unit 420 as a burst value Bst (phase difference information) (step S1020).

By using these processes, each of burst values having different amplitudes G0 for each of the divided gates is inputted to the position detection unit 420 so that the position detection unit 420 is allowed to carry out the position detecting operation on the magnetic head in the magnetic recording medium according to the present embodiment without the necessity of changing the conventional position detection processes.

Figure 11:
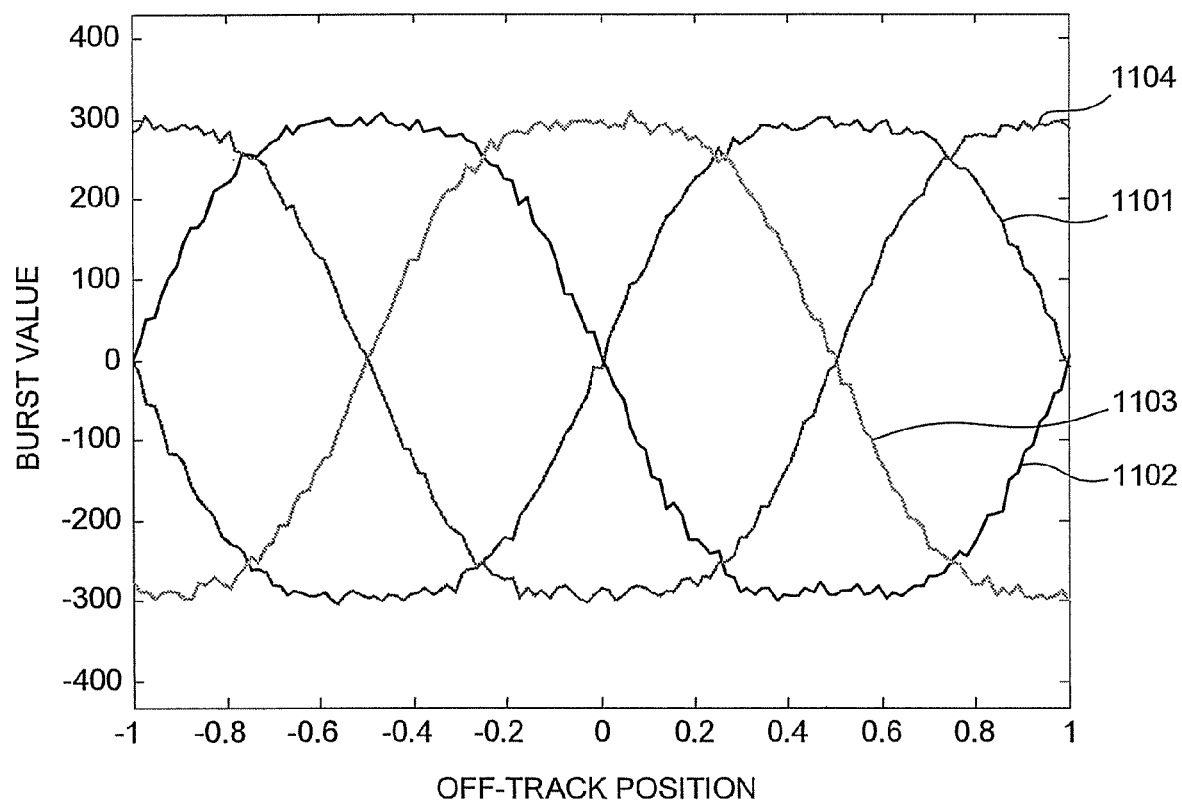
FIG. 11 is a graph that shows a state of a change in burst value Bst between an off-track position and each of gate intervals.

FIG. 11 is a graph that shows a state of a change in burst value Bst between an off-track position and each of gate intervals. Reference numeral 1101 indicates a burst value Bst in the gate A interval, 1102 indicates a burst value Bst in the gate B interval, 1103 indicates a burst value Bst in the gate C interval, and 1104 indicates a burst value Bst in the gate D interval.

Different from the amplitude value in each of the bursts A, B, C and D in the conventional magnetic recording medium, these burst values have plus and minus values of an average zero; however, it becomes possible to calculate four kinds of burst values having virtually the same trends as those of the respective bursts A, B, C and D of the conventional magnetic recording medium.

As described above, in the magnetic recording/reproducing apparatus according to the second embodiment, the burst gate is divided into four equal portions to prepare gate A, gate B, gate C and gate D intervals, and the inner product coefficient by which the sample values Y at four points are multiplied is made different and switched for each of the gate intervals; therefore, the position detection unit 420 is allowed to detect the position of the magnetic head in the magnetic recording medium according to the present embodiment in which a plurality of magnetic sections 301 in the burst area 113 are formed by a single burst recording pattern that tilts to the preamble recording pattern, without the necessity of changing the conventional position detection processes.

A third embodiment according to the present invention will be explained below.

In the magnetic recording/reproducing apparatus according to the second embodiment, a burst gate is divided into four equal intervals, and four kinds of different burst values are calculated by switching inner product coefficients for each of the divided gates by using the inner product calculation unit; however, in a magnetic recording/reproducing apparatus according to the third embodiment, weighting coefficients for inputted values are switched by using a finite impulse response (FIR) filter so that different burst values are calculated as phase difference information.

In the same manner as the second embodiment, the magnetic recording medium of the present embodiment, which has a structure in which a plurality of magnetic sections 301 are formed by using a single burst recording pattern that tilts to the preamble recording pattern, is designed so that the track width of the servo-area is ⅔ of the track width of the data area. Here, the magnetic recording medium of the first embodiment may be used for the magnetic recording/reproducing apparatus of the present embodiment.

Figure 12:
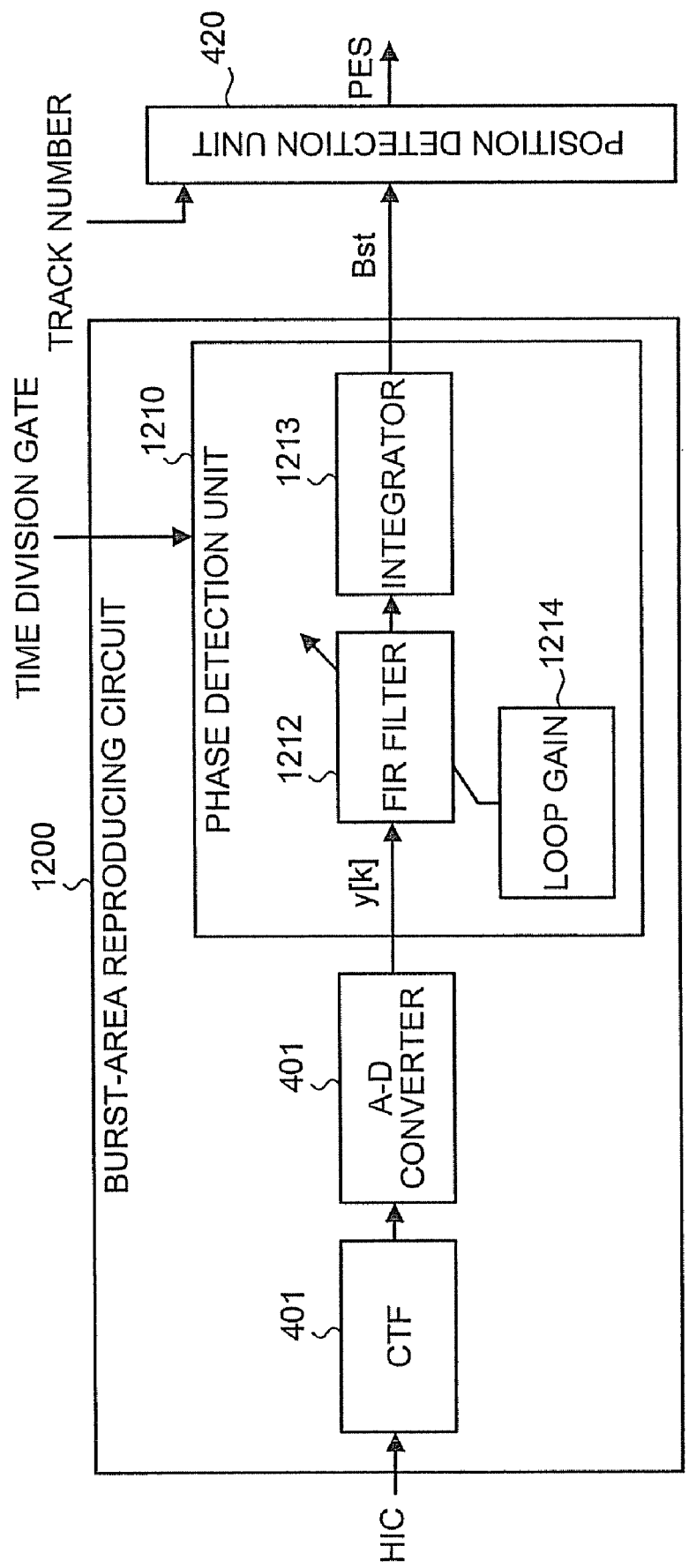
FIG. 12 is a block diagram that shows a structure of a burst-area reproducing circuit of a magnetic recording/reproducing apparatus according to a third embodiment.

FIG. 12 is a block diagram that shows a structure of a burst-area reproducing circuit 1200 of a magnetic recording/reproducing apparatus according to the third embodiment. As shown in FIG. 12, the burst-area reproducing circuit 1200 of the present embodiment is mainly constituted by a CTF 401, an A-D converter 402 and a phase detection unit 1210. The CTF 401 and the A-D converter 402 have the same functions as those of the CTF 401 and the A-D converter 402 of the burst-area reproducing circuit 400 of the first embodiment.

As shown in FIG. 12, the phase detection unit 1210 is provided with an FIR filter 1212, a loop gain 1214 and an integrator 1213.

The FIR filter (Finite Impulse Response Filter) 1212 is a filter, which, upon receipt of an impulse, allows an output signal to converge in a finite period of time, and equalizes the sample value of a burst reproduced signal converted into a digital signal by the A-D converter 402. In the present embodiment, the FIR filter 1212, which is composed of a filter with four taps, is designed to calculate an output value based upon equation (10) in response to an input signal.

$$\text{Out}[k] = A0*Y[k] + A1*Y[k-1] + A2*Y[k-2] + A3*Y[k-3] \quad (10)$$

Here, equation (10) indicates that the output value Out [k] with respect to k is represented by the weighted average of the present and past input values Y[k], Y[k−1], Y[k−2] and Y[k−3], and coefficients A0, A1, A2 and A3, which have been stored in the loop gain 1214, are referred to upon conducting calculations based upon equation (10).

As indicated by equation (10), the FIR filter 1212 carries out processes equivalent to the processes used for calculating the inner product value between the sample values Y at four points and the coefficients [A0, A1, A2, A3], and the burst-area reproducing circuit 800 of the present embodiment uses the FIR filter 1212 in place of the inner product calculation unit 812 of the second embodiment.

In the present embodiment, however, different from the second embodiment in which sample values at four points for each cycle are inputted so as to find the inner product value, the sample value of each point is inputted for each one point, and the inner products between the sample values at four points, that is, the inputted sample value Y[k] of the one point and the previous sample values at three points from the inputted time, Y[k−1], Y[k−2] and Y[k−3], and the coefficients A0, A1, A2 and A3 of the loop gain 1214, are found in accordance with equation (10). Moreover, in order to provide synchronization for each cycle, the coefficients A0, A1, A2 and A3 are looped and sequentially changed, each time the sample value is inputted. More specifically, the coefficients [A0, A1, A2, A3], used upon inputting a certain sample value, are changed to [A3, A0, A1, A2] upon inputting the next sample value, and then further changed to [A2, A3, A0, A1] upon inputting the succeeding sample value, so that, after having inputted the sample values at four points for one cycle, the sequence is looped to return to the first coefficients [A0, A1, A2, A3]. The FIR filter 1212 of this type is a circuit generally used for AGC processes and PLL processes in the reproduced signal processing of the preamble area; therefore, by utilizing this circuit for the burst-area reproducing process, it becomes possible to eliminate the necessity of installing a new circuit such as the inner product calculation unit, and consequently to make the circuit scale of the burst-area reproducing circuit smaller.

The integrator 1213 sequentially integrates the inner product values found in the FIR filter 1212 so as to suppress noise, and the resulting integrated value is outputted to the position detection unit 420 as a burst value Bst (phase difference information). In the phase detection unit 1210 of the present embodiment, since the sample value of each of the points is inputted to the FIR filter 1212 each time, no memory for storing the sample values at four points is installed, which is different from the second embodiment.

Figure 13:
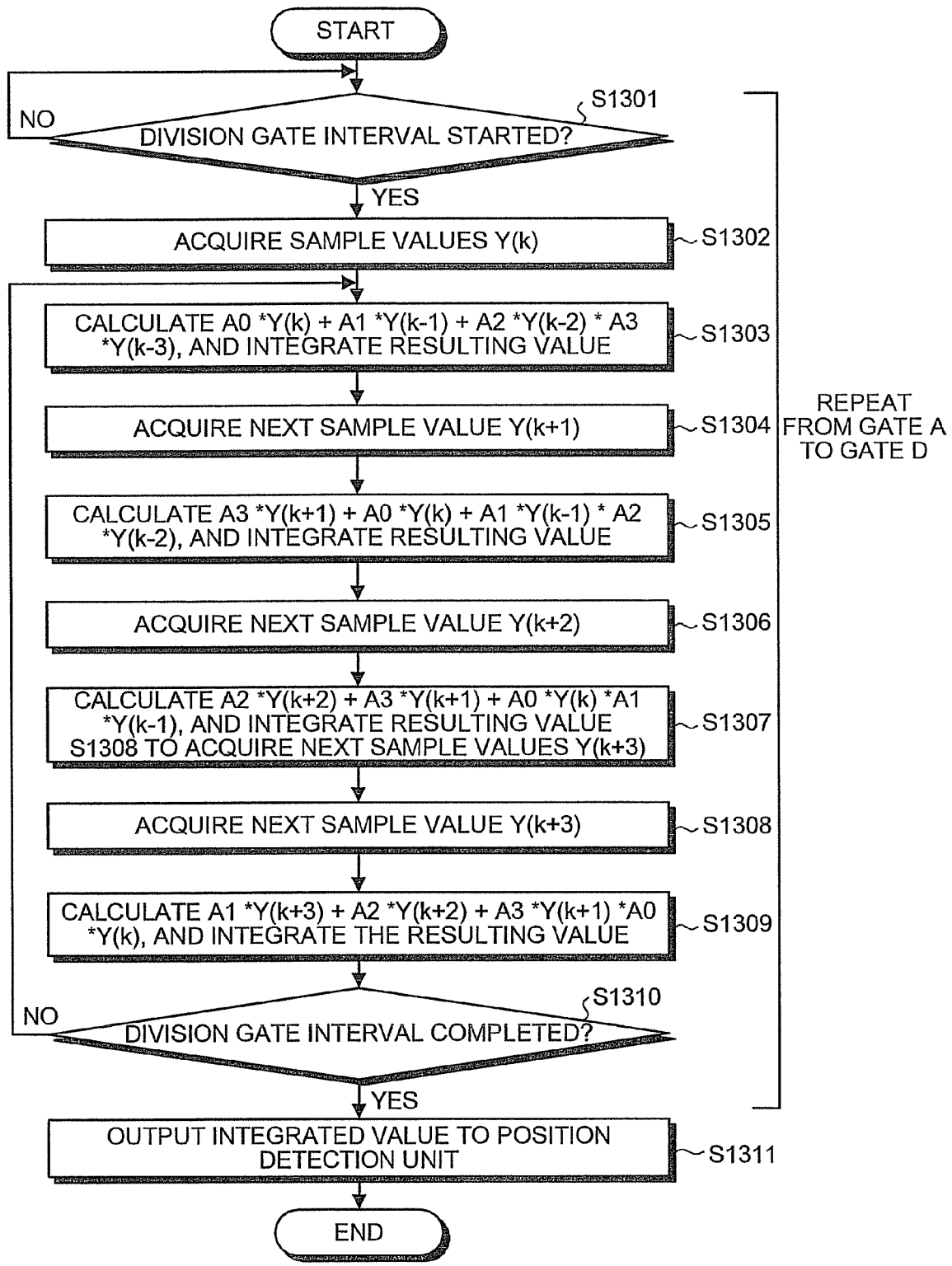
FIG. 13 is a flow chart that shows a sequence of burst-area reproducing processes according to the third embodiment.

The following description will discuss a burst area reproducing process to be carried out by the burst-area reproducing circuit 800 according to the present embodiment having the structure as described above. FIG. 13 is a flow chart that shows a sequence of the burst area reproducing processes according to the third embodiment.

When, after having passed over the preamble area 111 of the servo area 110 and the address area 112 and having been shifted to a target track, the magnetic head reaches the burst area 113, a burst gate gives a period in which a burst signal reproducing process is carried out in the same manner as the second embodiment, and in this embodiment, the burst gate is divided into equal portions, that is, gate A, gate B, gate C and gate D. In the same manner as the first embodiment, a burst reproduced signal is read from the burst area 113 through the magnetic head so that the analog reproduced signal thus read is sent to the CTF 401. The CTF 401 carries out a filtering process on the analog reproduced signal, and inputs the resulting signal to the A-D converter 402. In the A-D converter 402, the reproduced signal is sampled in synchronized sample timing with a synchronous clock determined in the reproduced signal processing of the preamble area.

In the phase detection unit 1210, when the divided gate interval (first, the gate A interval) is started (Yes: at step S1301), the FIR filter 1212 acquires the sample values Y[k] (step S1302). The FIR filter 1212 finds the inner product by multiplying the acquired sample value Y[k] and the previously acquired sample values Y[k−1], Y[k−2] and Y[k−3] by coefficients [A0, A1, A2, A3] based upon equation (10) and the resulting value is sequentially integrated by the integrator 1213 (step S1303).

Moreover, the FIR filter 1212 acquires the next sample value Y[k+1] from the A-D converter 402 (step S1304). Then, the FIR filter 1212 finds the inner product by multiplying the acquired sample value Y[k+1] and the previously acquired sample values Y[k], Y[k−1] and Y[k−2] by coefficients [A3, A0, A1, A2] that have been looped by one based upon equation (11), and the resulting value is sequentially integrated by the integrator 1213 (step S1305).

$$\text{Out}\,[k+1]=A3*Y[k+1]+A0*Y[k]+A1*Y[k-1]+A2*Y[k-2] \quad (11)$$

Next, the FIR filter 1212 acquires the next sample value Y[k+2] from the A-D converter 402 (step S1306). Then, the FIR filter 1212 finds the inner product by multiplying the acquired sample value Y[k+2] and the previously acquired sample values Y[k+1], Y[k] and Y[k−1] by coefficients [A2, A3, A0, A1] that have been looped by one based upon equation (12), and the resulting value is sequentially integrated by the integrator 1213 (step S1307).

$$\text{Out}\,[k+2]=A2*Y[k+2]+A3*Y[k+1]+A0*Y[k]+A1*Y[k-1] \quad (12)$$

Next, the FIR filter 1212 acquires the next sample value Y[k+3] from the A-D converter 402 (step S1308). Then, the FIR filter 1212 finds the inner product by multiplying the acquired sample value Y[k+3] and the previously acquired sample values Y[k+2], Y[k+1] and Y[k] by coefficients [A1, A2, A3, A0] that have been looped by one based upon equation (13), and the resulting value is sequentially integrated by the integrator 1213 (step S1309).

$$\text{Out}\,[k+3]=A1*Y[k+3]+A2*Y[k+2]+A3*Y[k+1]+A0*Y[k] \quad (13)$$

These processes of step S1302 to step S1303 are repeated until the current divided gate interval has been completed (step S1310: No). Upon completion of the current divided gate interval (Yes: step S1310), the burst value Bst (phase difference information) integrated in the current divided gate interval is sent to the position detection unit 420 (step S1311). The above-mentioned processes from step S1301 to S1311 are repeatedly carried out on gate A, gate B, gate C and gate D. With this arrangement, in the same manner as the second embodiment, a different burst value (phase difference information) is outputted to the position detection unit 420 for each of the gate intervals.

As described above, the magnetic recording/reproducing apparatus according to the third embodiment finds the burst value by switching inner product coefficients by the FIR filter; therefore, in the same manner as the second embodiment, the position detection unit 420 is allowed to detect the position of the magnetic head in the magnetic recording medium according to the present embodiment in which a plurality of magnetic sections 301 in the burst area 113 are formed by a single burst recording pattern that tilts to the preamble recording pattern, without the necessity of changing the conventional position detection processes.

In the magnetic recording/reproducing apparatus of the third embodiment, since the FIR filter 1212 that is used for preamble area reproducing processes upon calculating the inner product is utilized, it becomes possible to eliminate the necessity of installing a new circuit such as the inner product calculation unit, and consequently to make the circuit scale of the burst-area reproducing circuit smaller.

Here, with respect to the initial value of the coefficient of each of the gates, the value may be changed depending on the respective gates; however, it is more preferable to provide an arrangement in which, upon rise of each gate, the coefficient is further looped by one. In this case, different from the reproducing process of a magnetic recording medium having a burst area formed by a conventional burst recording pattern divided into four kinds of different bursts A, B, C and D, although the output order of the burst value for each gate is varied among the burst value corresponding to burst A, the burst value corresponding to burst B, the burst value corresponding to burst C and the burst value corresponding to burst D, the four kinds of the burst values are outputted so that it is possible to carry out the position detecting processes by using the position detection unit 420.

A fourth embodiment according to the present invention will be explained below.

In the magnetic recording/reproducing apparatus of the first embodiment, the phase detection unit 410 finds the phase difference cosine value C and the phase difference sine value S, and the phase difference cosine value C and the phase difference sine value S thus found, as they are, are outputted to the position detection unit 420; however, the magnetic recording/reproducing apparatus in accordance with the fourth embodiment finds the phase difference cosine value C and the phase difference sine value S and carries out division operations thereon so that the position deviation signal is subjected to approximation processes.

In the same manner as the first embodiment, the magnetic recording medium of the present embodiment has a structure in which a plurality of magnetic sections 301 in the burst area 113 are formed by a single burst recording pattern that tilts to the preamble recording pattern, and the track width of the servo-area is formed with the same width as the track width of the data area. Here, the magnetic recording medium of the second embodiment may be applied to the magnetic recording/reproducing apparatus of the present embodiment.

Figure 14:
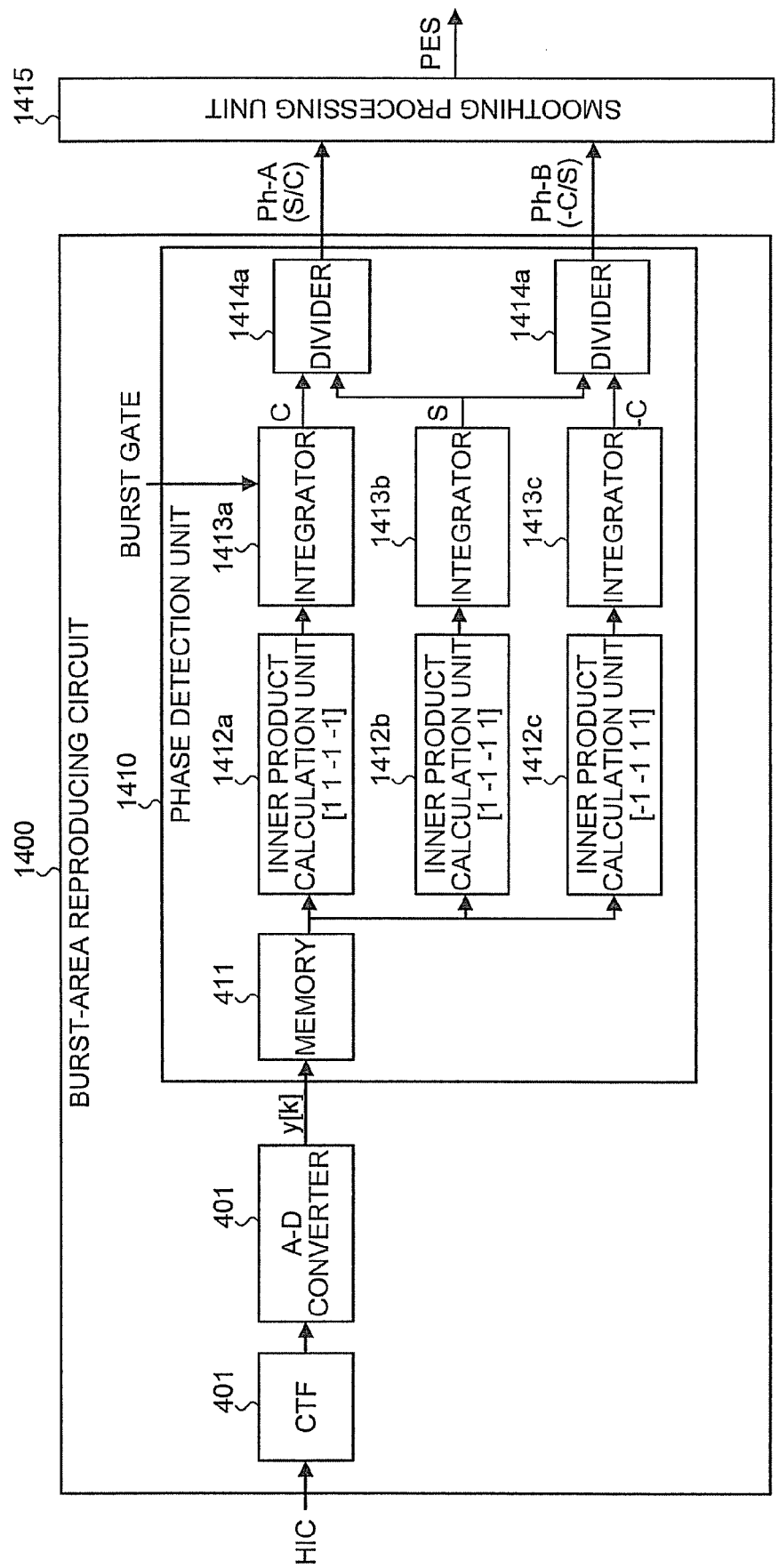
FIG. 14 is a block diagram that shows a structure of a burst-area reproducing circuit of a magnetic recording/reproducing apparatus according to a fourth embodiment.

FIG. 14 is a block diagram that shows a structure of a burst-area reproducing circuit 1400 of the magnetic recording/reproducing apparatus according to the fourth embodiment. As shown in FIG. 14, the burst-area reproducing circuit 1400 of the present embodiment is mainly constituted by a CTF 401, an A-D converter 402 and a phase detection unit 1410. The CTF 401 and the A-D converter 402 have the same functions as those of the CTF 401 and the A-D converter 402 of the burst-area reproducing circuit 400 of the first embodiment.

The phase detection unit 1410 detects the phase difference to find the phase difference cosine value C, (−C) and the phase difference sine value S from sample values at four points of a burst reproduced signal sampled by the A-D converter 402, and finds divided values S/C and (−C/S) from the value obtained by respectively integrating these values, and outputs the resulting values to a smoothing processing unit 1415.

As shown in FIG. 14, the phase detection unit 1410 is provided with a memory 411, three inner product calculation units 1412a, 1412b and 1412c, three integrators 1413a, 1413b and 1413c and two dividers 1414a and 1414b. Here, the memory 411 has the same functions as those of the memory 411 of the phase detection unit 410 of the first embodiment, and stores the sample values at four points outputted from the A-D converter 402.

The inner product calculation unit 1412a reads sample values Y at four points for each cycle from the memory 411, calculates the inner product between the sample values Y and cosine value detecting coefficients [1, 1, −1, −1] based upon equations (2) to (6) and outputs the phase difference cosine value C indicated by equation (14):

$$C=2\sqrt{2}*G0*\cos(H0) \quad (14)$$

The inner product calculation unit 1412b reads sample values Y at four points from the memory 411, calculates the inner product between the sample values Y and sine value detecting coefficients [1, −1, −1, 1] and outputs the phase difference sine value S indicated by equation (15):

$$S=2\sqrt{2}*G0*\sin(H0) \quad (15)$$

The inner product calculation unit 1412c reads sample values Y at four points from the memory 411, calculates the inner product between the sample values Y and cosine value detecting coefficients [−1, −1, 1, 1] and outputs the phase difference cosine value (−C) indicated by equation (16):

$$-C=-2\sqrt{2}*G0*\cos(H0) \quad (16)$$

In this case, the cosine value detecting coefficients [1, 1, −1, −1] are sine wave values with a phase difference of 0, the sine value detecting coefficients [1, −1, −1, 1] are cosine wave values with a phase difference of 0, and the cosine value detecting coefficients [−1, −1, 1, 1] are sine wave values with a phase difference of 180 degrees.

The integrator 1413a sequentially integrates the phase difference cosine value C found in the inner product calculation unit 1412a, the integrator 1413b sequentially integrates the phase difference sine value S found in the inner product calculation unit 1412b and the integrator 1413c sequentially integrates the phase difference cosine value −C found in the inner product calculation unit 1412c so as to respectively suppress noise.

The divider 1414a divides the integrated phase difference sine value S outputted from the integrator 1413b by the integrated phase difference cosine value C outputted from the integrator 1413a to find a divided value Ph_A (=S/C), and outputs the resulting value to the smoothing processing unit 1415. The divider 1414b divides the integrated phase difference cosine value −C outputted from the integrator 1413c by the integrated phase difference sine value S outputted from the integrator 1413b to find a divided value Ph_B (=−C/S), and outputs the resulting value to the smoothing processing unit 1415.

Strictly speaking, the phase of the reproduced signal is detected as arctan (C/S) that is an arctangent of the phase difference cosine value C and the phase difference sine value S; however, in the vicinity of a position corresponding to phase 0, the value of arctan (C/S) can be approximated to the divided value of S/C. For this reason, in the present embodiment, the divided value ph-A=S/C is found as phase difference information by the divider 1414a of the phase detection unit 1410 so that the phase difference from the track center is detected.

Moreover, at a position having a phase offset of 90 degrees, the phase difference cosine value C=0 holds, failing to find the divided value S/C; therefore, in the vicinity of such a position, the reliability in phase difference deteriorates. For this reason, the phase detection unit 1410 of the present embodiment finds the divided value Ph_B=−C/S as phase difference information having an offset of 90 degrees by using the divider 1414b.

The smoothing processing unit 1415 to which pieces of phase difference information Ph_A and Ph_B have been inputted from the phase detection unit 1410 carries out a smoothing process by weighted-averaging these two values to find position deviation information.

Figure 15:
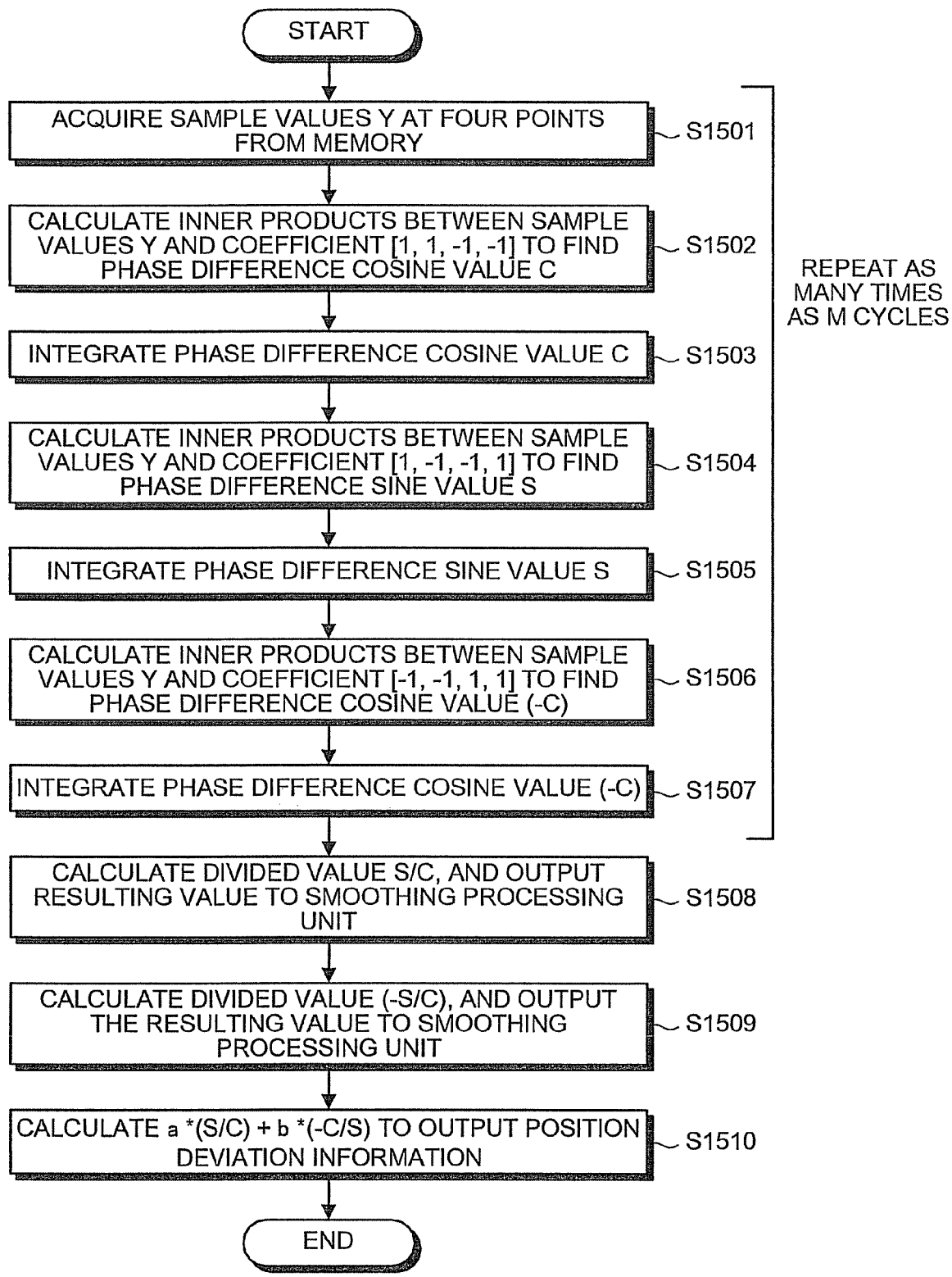
FIG. 15 is a flow chart that shows a sequence of burst-area reproducing processes according to the fourth embodiment.

The following description will discuss a burst-area reproducing process carried out by the burst-area reproducing circuit 1400 according to the present embodiment having the above-mentioned arrangement. FIG. 15 is a flow chart that shows a sequence of burst-area reproducing processes according to the fourth embodiment.

When, after having passed over the preamble area 111 of the servo area 110 and the address area 112 and having been shifted to a target track, the magnetic head reaches the burst area 113, a burst gate is allowed to rise in the same manner as the first embodiment. Then, a burst reproduced signal is read from the burst area 113 through the magnetic head so that the analog reproduced signal thus read is sent to the CTF 401. The CTF 401 carries out a filtering process on the analog reproduced signal, and the A-D converter 402 samples the reproduced signal in synchronized sample timing with a synchronous clock determined in the reproduced signal processing of the preamble area so that sample values Y at four points for each cycle are stored in the memory 411 of the phase detection unit 410.

The inner product calculation unit 1412a, the inner product calculation unit 1412b and the inner product calculation unit 1412c of the phase detection unit 1410 acquire the sample values Y at four points from the memory 411 (step S1501).

The inner product calculation unit 1412a calculates the inner product between the acquired sample values Y and the cosine value detecting coefficients [1, 1, −1, −1] to find a phase difference cosine value C (step S1502). This phase difference cosine value C is indicated by equation (14), and the resulting value is outputted to the integrator 1413a. The integrator 1413a sequentially integrates the inputted phase difference cosine value C (step S1503).

Moreover, the inner product calculation unit 1412b calculates the inner product between the acquired sample values Y and the sine value detecting coefficients [1, −1, −1, 1] to find a phase difference sine value S (step S1504). This phase difference sine value S is indicated by equation (15), and the resulting value is outputted to the integrator 1413b. The integrator 1413b sequentially integrates the inputted phase difference sine value S (step S1505).

The inner product calculation unit 1412c calculates the inner product between the acquired sample values Y and the cosine value detecting coefficients [−1, −1, 1, 1] to find a phase difference cosine value −C (step S1506). This phase difference cosine value −C is indicated by equation (16), and the resulting value is outputted to the integrator 1413c. The integrator 1413c sequentially integrates the inputted phase difference cosine value (−C) (step S1507). Moreover, the processes from the steps S1501 to S1507 are repeatedly carried out as many times as M cycles included in the interval of the burst gate. With respect to the M cycles, in the same manner as the first embodiment, all the cycles of the magnetic sections 301 of the burst area 112 (21 cycles in the example of FIG. 2) may be included therein, or may be set to 18 cycles by allowing the burst gate to rise at the point of time after a lapse of time corresponding to two cycles since the start of the reproducing process in the burst area 113 and also to fall one cycle before the completion position of the burst area 113.

Upon completion of the above-mentioned repetitive processes corresponding to M cycles, the integrated phase difference sine value S outputted from the integrator 1413b is divided by the integrated phase difference cosine value C outputted from the integrator 1413a in the divider 1414a to find phase difference information Ph_A (=S/C), and the resulting value is outputted to the smoothing processing unit 1415 (step S1508).

Next, the integrated phase difference cosine value −C outputted from the integrator 1413c is divided by the integrated phase difference sine value S outputted from the integrator 1413b in the divider 1414b to find phase difference information Ph_B (=−C/S), and the resulting value is outputted to the smoothing processing unit 1415 (step S1509). The smoothing processing unit 1415 to which the pieces of phase difference information Ph_A (=S/C) and Ph_B (=−C/S) have been inputted calculates the weighted average a*(S/C)+b*(−C/S) (a, b: weighting coefficients) so as to carry out a smoothing process to find position deviation information PES (step S1510).

In this manner, the magnetic recording/reproducing apparatus according to the fourth embodiment finds the phase difference cosine value C and the phase difference sine value S, and a dividing operation is carried out so that arctan (C/S) is approximated by Ph_A (=S/C) and Ph_B (=−C/S) to find a position deviation signal; therefore, it is possible to positively find a phase difference irrespective of the position from the track center, and consequently to detect the position of the magnetic head with high precision.

In the fourth embodiment, arctan (C/S) in the vicinity of each of a position corresponding to phase 0 and a position having an offset in phase of 90 degrees is approximated by each of Ph_A (=S/C) and Ph_B (=−C/S), and another structure in which four inner product calculation units and dividers are respectively installed may be prepared so that four pieces of phase difference information approximated at positions having respectively offset phases by 90 degrees can be found.

Figure 16:
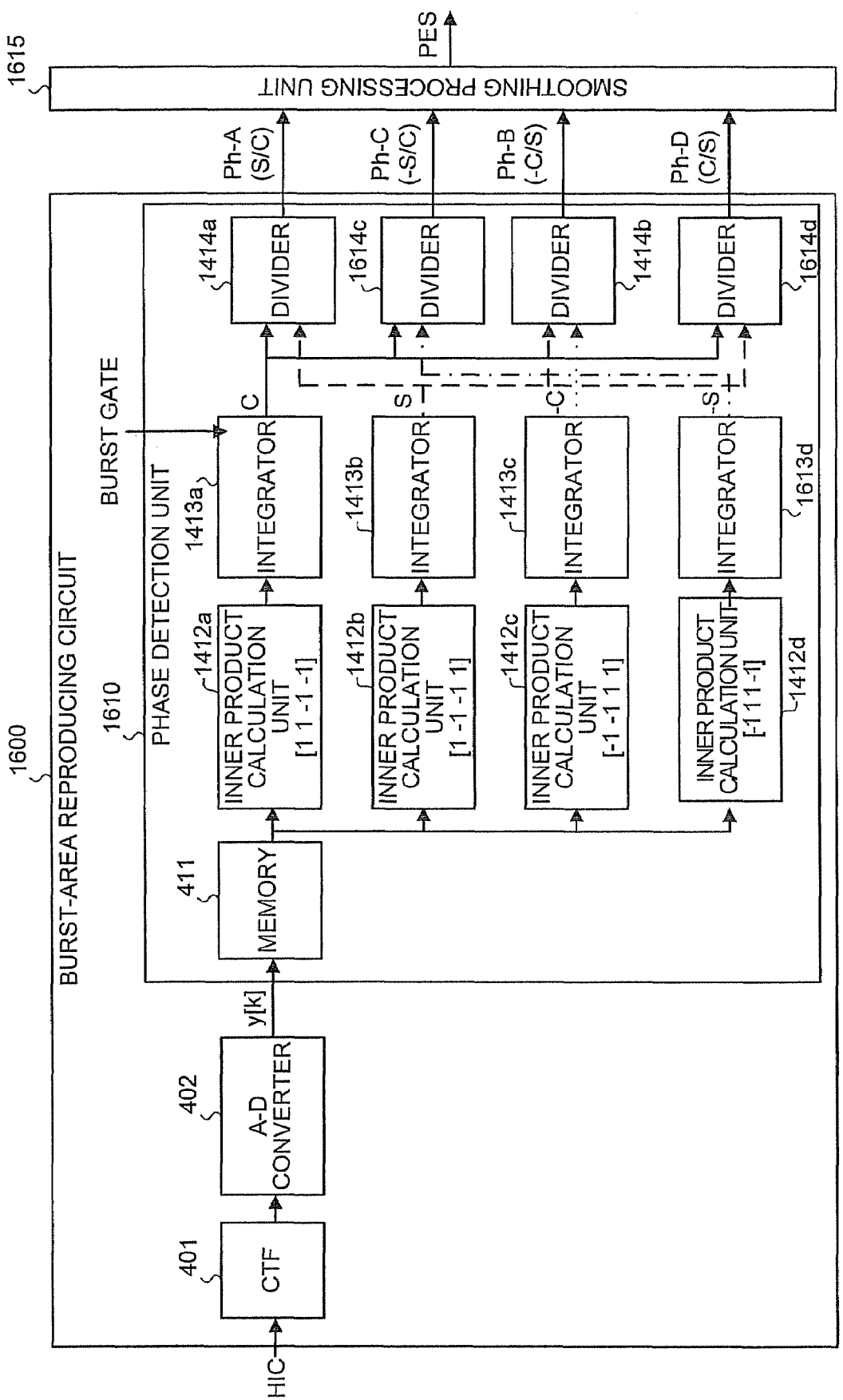
FIG. 16 is a block diagram that shows a structure of a burst-area reproducing circuit 1600 that is a modification of the fourth embodiment.

FIG. 16 is a block diagram that shows a structure of a burst-area reproducing circuit 1600 that is a modification of the fourth embodiment. In this modification, as shown in FIG. 14, a phase detection unit 1610 is provided with a memory 411, four inner product calculation units 1412a, 1412b, 1412c and 1612d, four integrators 1413a, 1413b, 1413c and 1613d, and four dividers 1414a, 1414b, 1614c and 1614d. Here, the memory 411 has the same functions as those of the memory 411 of the phase detection unit 410 of the first embodiment, and stores sample values at four points outputted from the A-D converter 402.

In the same manner as the fourth embodiment, the inner product calculation units 1412a, 1412b and 1412c read sample values Y at four points for each cycle, and calculate respective inner products between sample values Y indicated by equations (2) to (6) and the cosine value detecting coefficients [1, 1, −1, −1], the sine value detecting coefficients [1, −1, −1, 1] as well as the cosine value detecting coefficients [−1, −1, 1, 1], thereby outputting a phase difference cosine value C, a phase difference sine value S and a phase difference cosine value −C respectively indicated by equations (14), (15) and (16).

The inner product calculation unit 1612d, which is added in this modification, reads sample values Y at four points from the memory 411, calculates the inner product between the sample values Y and the sine value detecting coefficients [−1, 1, 1, −1] and outputs a phase difference sine value (−S) indicated by equation (17):

$$-S = -2\sqrt{2} * G_0 * \sin(H_0) \qquad (17)$$

Here, the sine value detecting coefficients [−1, 1, 1, −1] represent cosine values, each having a phase difference of 180 degrees.

In the same manner as the fourth embodiment, each of the integrators 1413a, 1413b and 1413c sequentially integrates the phase difference cosine value C, the phase difference sine value S and the phase difference cosine value −C found in the inner product calculation units 1412a, 1412b and 1412c so as to suppress the noise. The integrator 1613d sequentially integrates the phase difference sine value −S found in the integrator 1613d so as to suppress noise.

In the same manner as the fourth embodiment, the divider 1414a divides the integrated phase difference sine value S outputted from the integrator 1413b by the integrated phase difference cosine value C outputted from the integrator 1413a to find a divided value Ph_A (=S/C), and outputs the resulting value to the smoothing processing unit 1615.

In the same manner as the fourth embodiment, the divider 1414b divides the integrated phase difference cosine value −C outputted from the integrator 1413c by the integrated phase difference sine value S outputted from the integrator 1413b to find a divided value Ph_B (=−C/S), and outputs the resulting value to the smoothing processing unit 1615.

The divider 1614c divides the integrated phase difference sine value −S outputted from the integrator 1613d by the integrated phase difference cosine value C outputted from the integrator 1413a to find a divided value Ph_C (=−S/C), and outputs the resulting value to the smoothing processing unit 1615.

The divider 1614d divides the integrated phase difference cosine value C outputted from the integrator 1413a by the integrated phase difference sine value S outputted from the integrator 1413b to find a divided value Ph_D (=C/S), and outputs the resulting value to the smoothing processing unit 1615.

These pieces of phase difference information Ph_A=S/C, Ph_B=−C/S), Ph_C=−S/C, and Ph_D=C/S are obtained by respectively approximating arctan (C/S) in the vicinity of each of off-track positions of phase 0, phase offset of 90 degrees, phase offset of 180 degrees and phase offset of 270 degrees.

Figure 17:
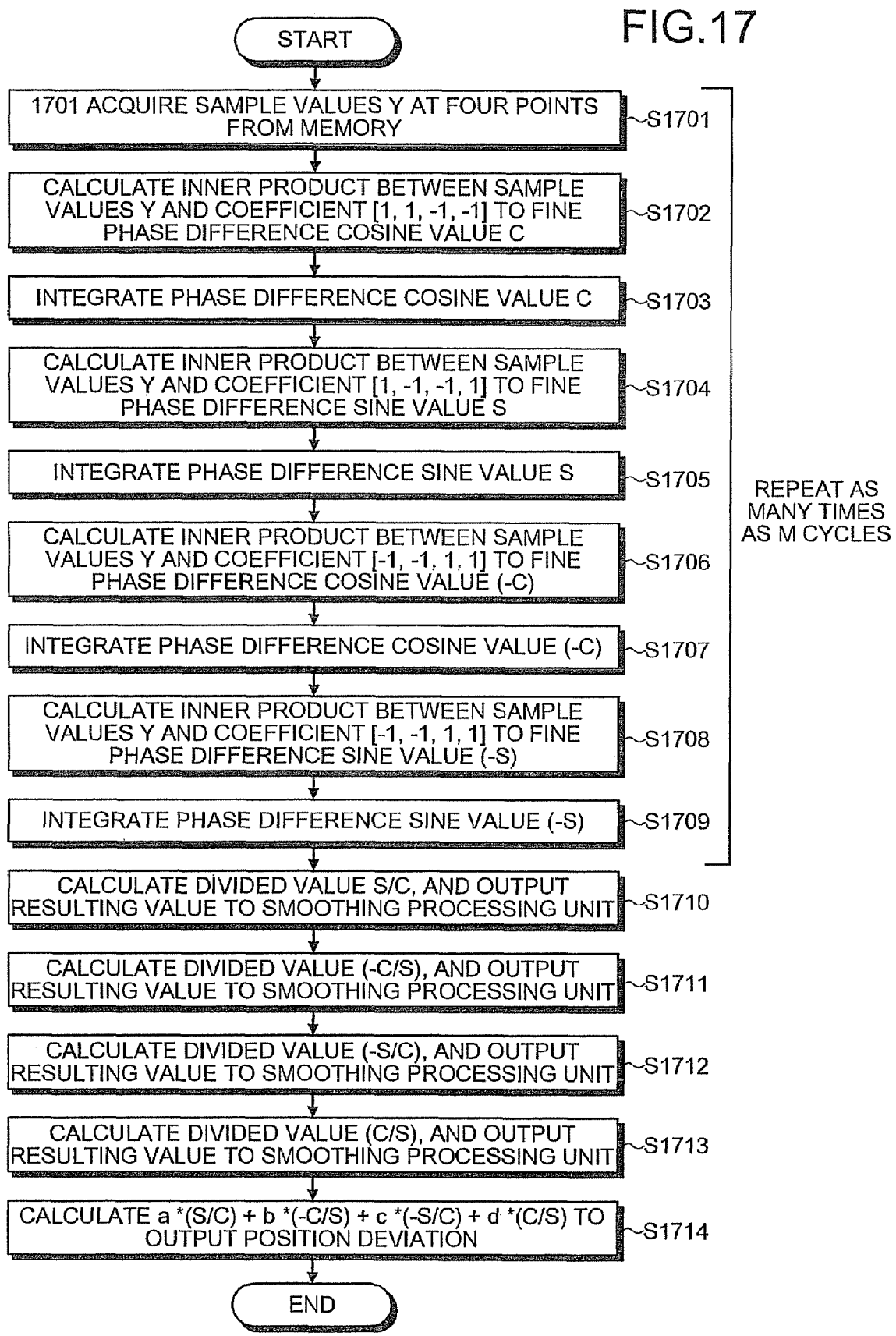
FIG. 17 is a flow chart that shows a sequence of burst-area reproducing processes of the modification of the fourth embodiment.

The following description will discuss a burst area reproducing process carried out by a burst-area reproducing circuit 1600 of this modification having the above-mentioned structure. FIG. 17 is a flow chart that shows a sequence of the burst area reproducing process of the modification of the fourth embodiment.

Here, sample values Y at four points are acquired from the memory 411 by the inner product calculation unit 1412a, the inner product calculation unit 1412b and the inner product calculation units 1412c and 1612d of the phase detection unit 1410 (step S1701), and the inner product calculation processes by the inner product calculation units 1412a, 1412b and 1412c and the integrating processes by the integrators 1413a, 1413b and 1413c (steps S1702 to S1707) are carried out in the same manner as those processes (S1502 to S1507) of the fourth embodiment.

Next, the inner product calculation unit 1612d calculates the inner product between the acquired sample value Y and the sine value detecting coefficients [−1, −1, 1, 1] to find a phase difference sine value −S (step S1708). This phase difference sine value −S is indicated by equation (17), and the resulting value is outputted to the integrator 1613d. The integrator 1614d sequentially integrates the inputted phase difference sine value −S (step S1709).

Moreover, the above-mentioned processes from the steps S1701 to S1709 are repeatedly carried out as many times as M cycles, and upon completion of the processes as many times as M cycles, the divider 1414a divides the integrated phase difference sine value S outputted from the integrator 1413b by the integrated phase difference cosine value C outputted from the integrator 1413a to find phase difference information Ph_A (=S/C), and outputs the resulting value to the smoothing processing unit 1615 (step S1710).

Next, the divider 1414b divides the integrated phase difference cosine value −C outputted from the integrator 1413c by the integrated phase difference sine value S outputted from the integrator 1413b to find phase difference information Ph_B (=−C/S), and outputs the resulting value to the smoothing processing unit 1615 (step S1711).

Moreover, the divider 1414c divides the integrated phase difference sine value −S outputted from the integrator 1613d by the integrated phase difference cosine value C outputted from the integrator 1413a to find a divided value Ph_C (=−S/C), and outputs the resulting value to the smoothing processing unit 1615 (step S1712).

Furthermore, the divider 1614d divides the integrated phase difference cosine value C outputted from the integrator 1413a by the integrated phase difference sine value S outputted from the integrator 1413b to find a divided value Ph_D (=C/S), and outputs the resulting value to the smoothing processing unit 1615 (step S1713).

The smoothing processing unit 1615 to which pieces of phase difference information Ph_A (=S/C), Ph_B (=−C/S), Ph_C (=−S/C), and Ph_D(=C/S) have been inputted calculates an weighted average a*(S/C)+b*(−C/S)+c*(−S/C)+d*(C/S) (a, b, c, d: weighting coefficients) so that a smoothing operation is carried out to find position deviation information PES (step S1714).

As described above, in the magnetic recording/reproducing apparatus of the modification of the fourth embodiment, four pieces of phase difference information, each approximated at each position having a phase offset of 90 degrees, are found to obtain a position deviation signal so that the phase difference can be positively found irrespective of the position from the track center; thus, it becomes possible to detect the position of the magnetic head with high precision.

A fifth embodiment according to the present invention will be explained below.

The magnetic recording/reproducing apparatus according to the first to fourth embodiments, the position detection of the magnetic head is carried out by using a reproduced signal from the burst area 113; however, the magnetic recording/reproducing apparatus according to the fifth embodiment further detects a shifting speed of the magnetic head in the radial direction of the recording medium from the reproduced signal from the burst area 113.

In the same manner as the first embodiment, the magnetic recording medium of the present embodiment has a structure in which a plurality of magnetic sections 301 of the burst area 113 are formed by a single burst recording pattern that tilts to the preamble recording pattern, and the track width of the servo-area is formed with the same width as the track width of the data area. Here, the magnetic recording medium of the second embodiment may be used for a magnetic recording/reproducing apparatus of the present embodiment.

Figure 18:
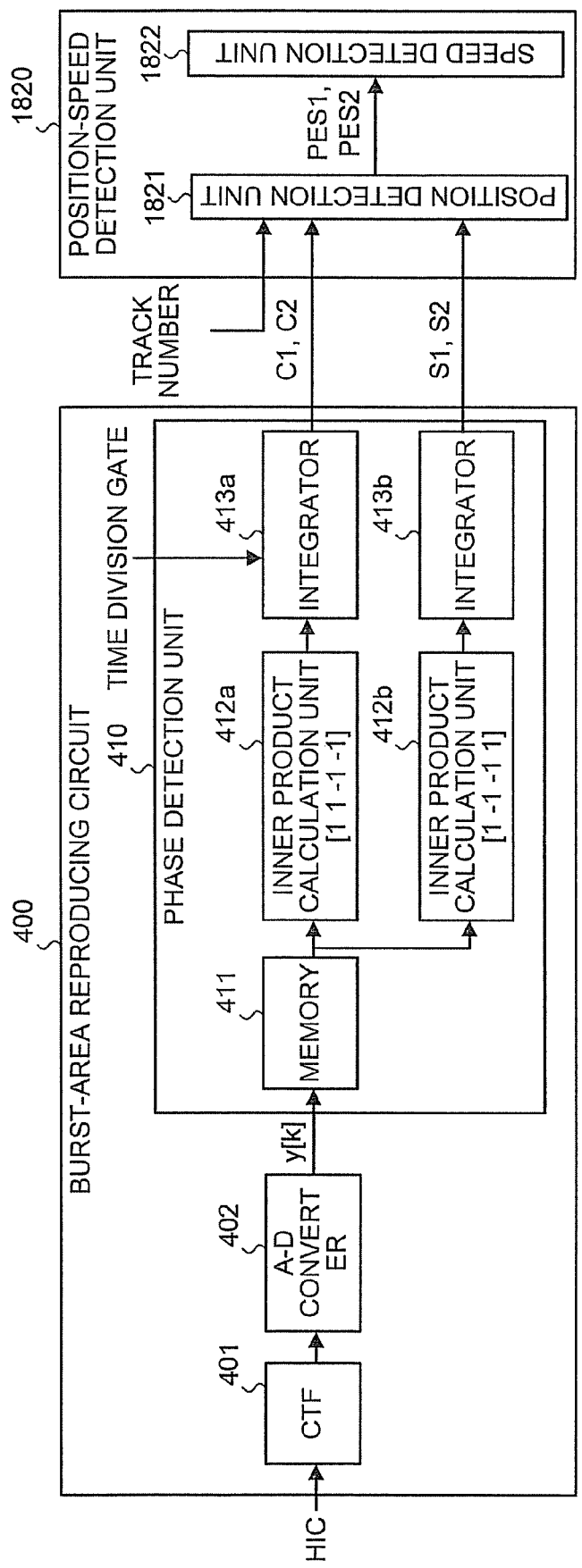
FIG. 18 is a block diagram that shows a structure of a burst-area reproducing circuit and a position-speed detection unit of a magnetic recording/reproducing apparatus according to a fifth embodiment.

FIG. 18 is a block diagram that shows a structure of a burst-area reproducing circuit and a position-speed detection unit 1820 of the magnetic recording/reproducing apparatus according to the fifth embodiment. The burst-area reproducing circuit 400 has the same circuit structure as that of the first embodiment. In the present embodiment, the burst gate is divided into two sections, and for each of divided gate 1 and gate 2 intervals, phase difference cosine values C1 and C2 and phase difference sine values S1 and S2 are found.

The speed-position detection unit 1820 detects the position of the magnetic head on the track and a speed thereof in the radial direction of the recording medium. As shown in FIG.

18, the speed-position detection unit 1820 is provided with a position detection unit 1821 and a speed detection unit 1822.

The position detection unit 1821 is inputted with the phase difference cosine value, the phase difference sine value and the track number for each of the divided gate intervals, and finds pieces of position deviation information PES1 and PES2 for each of the divided gate intervals. In other words, the position deviation information PES1 is found from the phase difference cosine value C1 and the phase difference sine value S1 calculated in the gate interval 1, and the position deviation information PES2 is found from the phase difference cosine value C2 and the phase difference sine value S2 calculated in the gate interval 2. Here, the position deviation information is found from the phase difference cosine value and the phase difference sine value by using the same method as the position detection unit 420 of the first embodiment.

The speed detection unit 1822 calculates the shifting speed in the radial direction of the magnetic head from the pieces of position deviation information PES1 and PES2 for each of the gate intervals.

Figure 19:
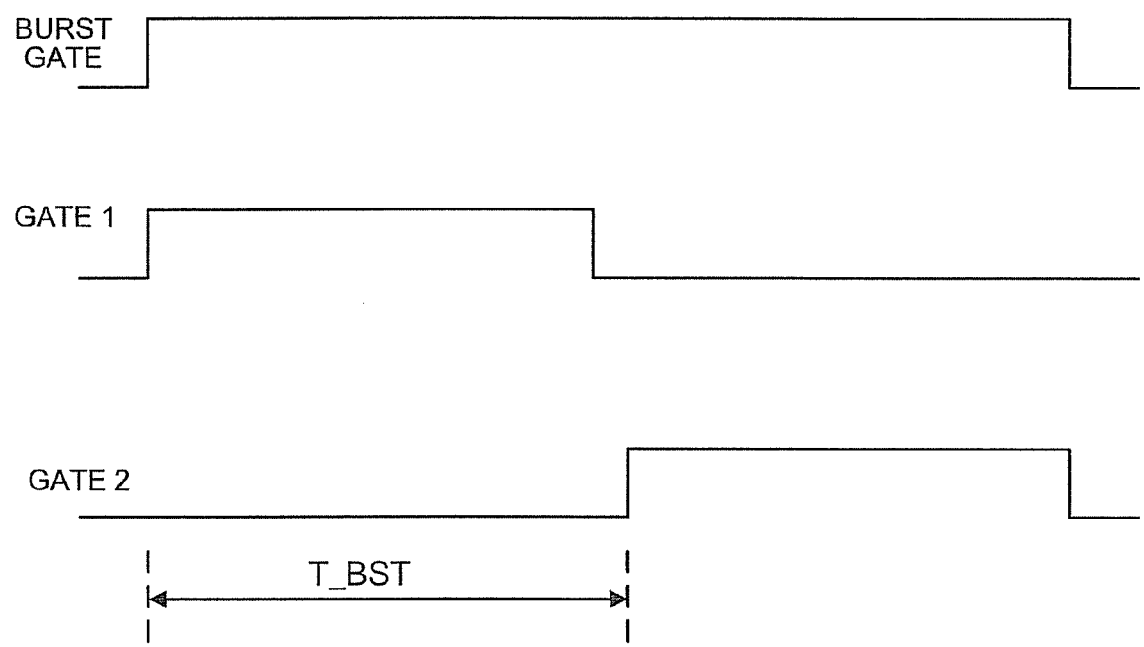
FIG. 19 is an explanatory view that shows a state in which a burst gate is divided.

FIG. 19 is an explanatory view that shows a state in which a burst gate is divided. In the present embodiment, the burst gate is equally divided; however, the burst gate is not necessarily divided equally. Here, as shown in FIG. 19, when the delay time for rising in the divided latter half of gate interval is defined as T_BST, the position deviation information PES and the shifting speed in the radial direction v of the magnetic head are represented by the following equations (18) and (19) by using the position deviation information PES1 found in the gate interval 1, that is, the former half, and the position deviation information PES2 found in the gate interval 2, that is, the latter half.

$$PES=(PES1+PES2)/2 \tag{18}$$

$$v=(PES2-PES1)/T\_BST \tag{19}$$

The reason that, in equation (18), PES1 and PES2 are added and then divided by two is explained as follows: although the position detection with higher precision is available as the interval becomes longer, the burst gate is divided into two and made shorter in the present embodiment, with the result that influences due to the noise appear in both of PES1 and PES2 to cause degradation in the position detecting precision; therefore, the above-mentioned methods are taken so as to prevent this problem.

Moreover, in equation (19), with respect to the shift of the magnetic head in the radial direction in the burst area, since changes in the acceleration can be ignored, the difference between PES1 and PES2 is divided by the delay time T_BST for rising upon calculating the shifting speed in the radial direction.

Figure 20:
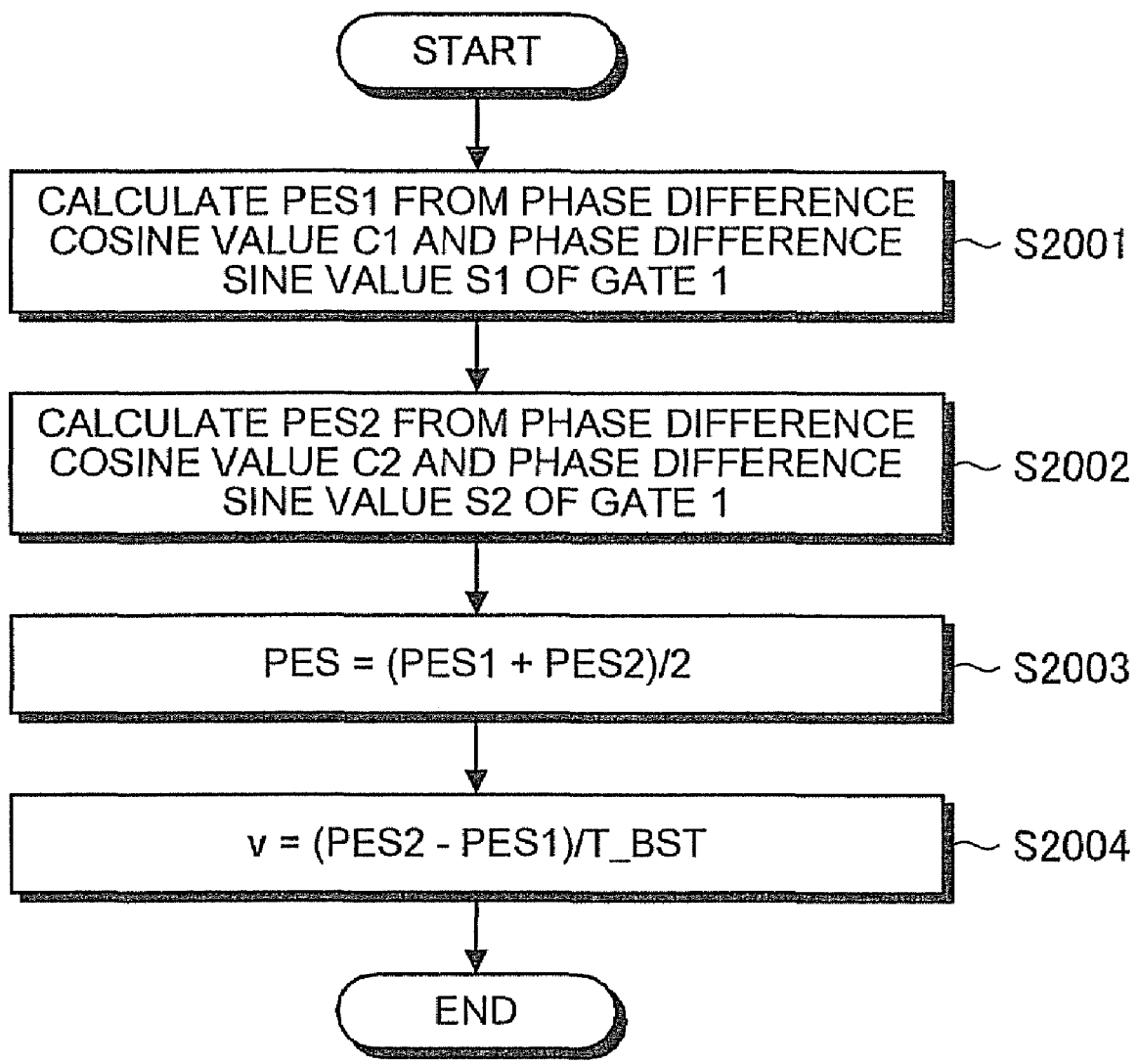
FIG. 20 is a flow-chart that shows a sequence of magnetic head position-speed detecting processes by a magnetic recording/reproducing apparatus according to the fifth embodiment.

Next, the following description will discuss the position-speed detecting processes of the magnetic head in a magnetic recording/reproducing apparatus 1800 according to the present embodiment having the above-mentioned structure. FIG. 20 is a flow chart that shows a sequence of magnetic head position-speed detecting processes by the magnetic recording/reproducing apparatus 1800 according to the fifth embodiment.

When, after having passed over the preamble area 111 of the servo area 110 and the address area 112 and having been shifted to a target track, the magnetic head reaches the burst area 113, gate 1, that is, the former half of the divided two burst gates, is allowed to rise, and during this gate terminal 1, the phase difference cosine value C1 and the phase difference sine value S1 are found by the phase detection unit 410 in the same manner as the first embodiment, and the position detection unit 1821 calculates position deviation information PES1 in the same manner as the first embodiment (step S2001).

Next, when gate 2, that is, the latter half of the divided gates, is allowed to rise with a delay of T_BST from gate 1, the phase detection unit 410 finds the phase difference cosine value C2 and the phase difference sine value S2 during the gate interval 2, in the same manner as the first embodiment, and the position detection unit 1821 calculates the position deviation information PES2 in the same manner as the first embodiment (step S2002).

Next, based upon PES1 found in the gate interval 1 and PES2 found in the gate interval 2, the position detection unit 1821 calculates position deviation information PES by using equation (18)(step S2003). Next, based upon PES1, PES2 and the delay time T_BST for rising, the speed detection unit 1822 calculates a shifting speed v in the radial direction of the magnetic head by using equation (19)(step S2004).

In this manner, in the magnetic recording/reproducing apparatus 1800 according to the fifth embodiment, the burst gate is divided into two sections, and pieces of position deviation information PES1 and PES2 are found from the respective gate intervals of the former half and latter half thereof, and based upon these PES1 and PES2, the position deviation information PES and the shifting speed in the radial direction of the magnetic head are found; therefore, it is possible to detect the position of the magnetic head with higher precision. Moreover, according to the present embodiment, since the shifting speed in the radial direction can be detected by using the burst area, it becomes possible to find the shifting speed with higher precision in comparison with the arrangement in which the shifting speed is found based upon the difference of positions between sectors during a seeking operation in which the magnetic head travels between the tracks, thereby greatly improving the seeking performance.

A sixth embodiment according to the present invention will be explained below.

In the magnetic recording/reproducing apparatus 1800 according to the fifth embodiment, the burst gate is divided, and based upon pieces of position deviation information PES1 and PES2 found from the respective divided gates, the position deviation information PES of the magnetic head and the shifting speed v in the radial direction of the magnetic head are calculated; however, a magnetic recording/reproducing apparatus according to the sixth embodiment further switches the gate intervals so as to calculate the position deviation information PES of the magnetic head and the shifting speed v in the radial direction of the magnetic head.

In the same manner as the first embodiment, the magnetic recording medium of the present embodiment has a structure in which a plurality of magnetic sections 301 of the burst area 113 are formed by a single burst recording pattern that tilts to the preamble recording pattern, and the track width of the servo-area is formed with the same width as the track width of the data area. Here, the magnetic recording medium of the second embodiment may be used for a magnetic recording/reproducing apparatus of the present embodiment.

Figure 21:
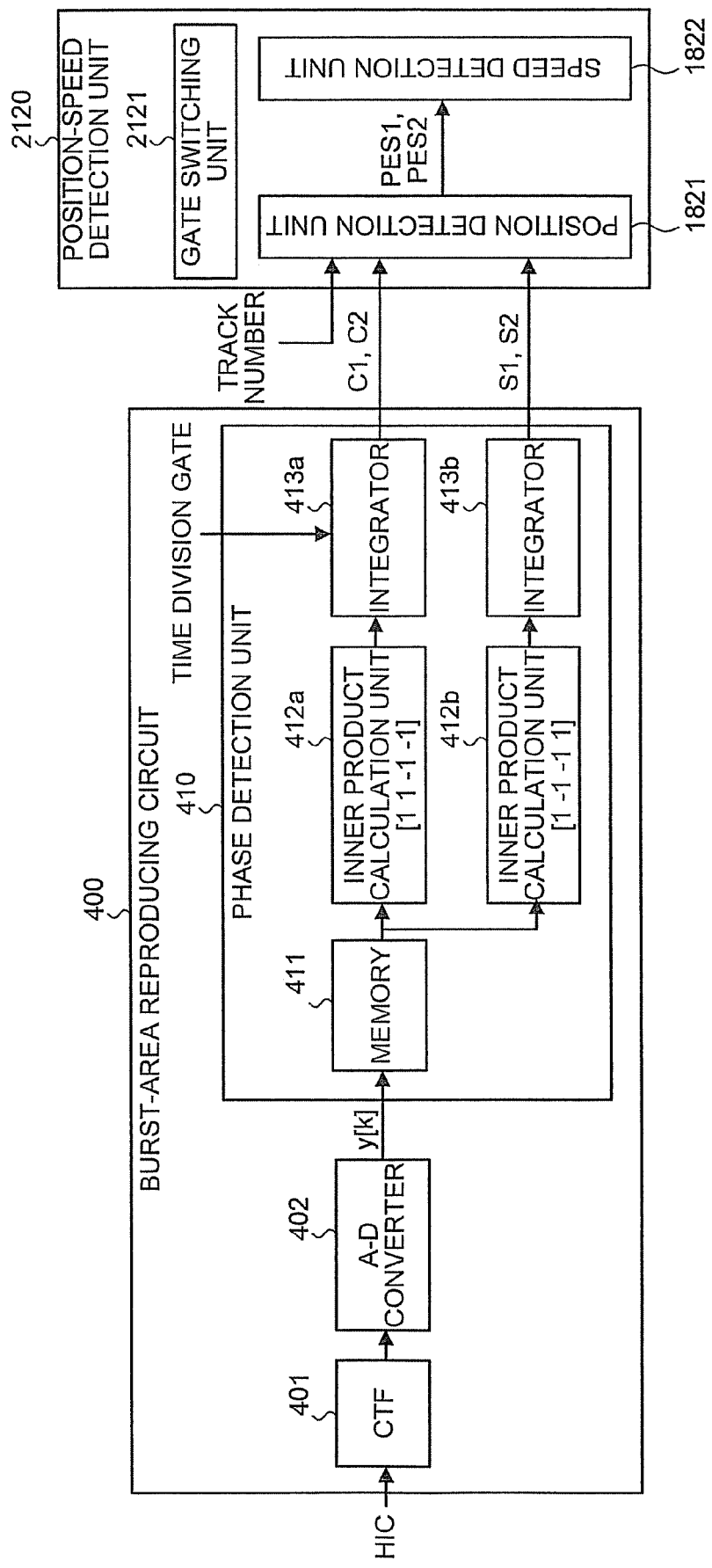
FIG. 21 is a block diagram that shows a structure of a burst-area reproducing circuit and a position-speed detecting unit of a magnetic recording/reproducing apparatus according to a sixth embodiment.

FIG. 21 is a block diagram that shows a structure of a burst-area reproducing circuit and a position-speed detecting unit 2120 of a magnetic recording/reproducing apparatus according to the sixth embodiment. The burst-area reproducing circuit 400 has the same circuit structure as that of the first embodiment.

The speed-position detecting unit 2120 switches divided gates of the burst gate so that the position of the magnetic head on the track is detected and the speed thereof in the radial direction of the recording medium is also detected. As shown in FIG. 21, the speed-position detecting unit 2120 is provided with a position detection unit 1821, a speed detection unit 1822 and a gate switching unit 2121. Here, the position detection unit 1821 and the speed detection unit 1822 have the same functions as the position detection unit 1821 and the speed detection unit 1822 of the fifth embodiment.

During the positioning control of the magnetic head on the track, the gate switching unit 2121 does not divide the burst gate, and during the seeking operation that allows the magnetic head to shift between tracks, it switches operations so as to divide the burst gate into two sections. Since the position detection precision becomes higher as the burst gate is made longer, this arrangement is made so as to make the precision of the position detection highest during the positioning control of the magnetic head; in contrast, during the seeking operation of the magnetic head, since the speed detection should be preferentially carried out rather than the position detection, the burst gate is divided so as to effectively carry out the speed detection.

Moreover, during the seeking operation of the magnetic head, the gate switching unit 2121 changes the delay time T_BST for rising in the fifth embodiment depending on the target speed so as to adjust the divided gate intervals.

In recent years, the track pitch of the magnetic recording medium is narrowed with the result that at the time of maximum seeking speed of the magnetic head, the amount of shift in the radial direction thereof upon passing through the burst area sometimes tends to exceed one track. For this reason, in the case where the speed detection is carried out by dividing the burst gate into two sections as described in the fifth embodiment, the shifting speed of the magnetic head might be erroneously detected; therefore, a difference in the positions of the magnetic head between sectors is taken, and the detection of the shifting speed of the magnetic head has to be conducted based upon this difference value and the shift time between the sectors, resulting in degradation in the precision of the speed detection. For this reason, in the present embodiment, during the seeking time of the magnetic head, by shortening the delay time T_BST for rising in response to the target speed, the amount of fluctuations in the position deviation information PES for each of the divided gates is suppressed so that it becomes possible to prevent the erroneous detection in the shifting speed.

Figure 22:
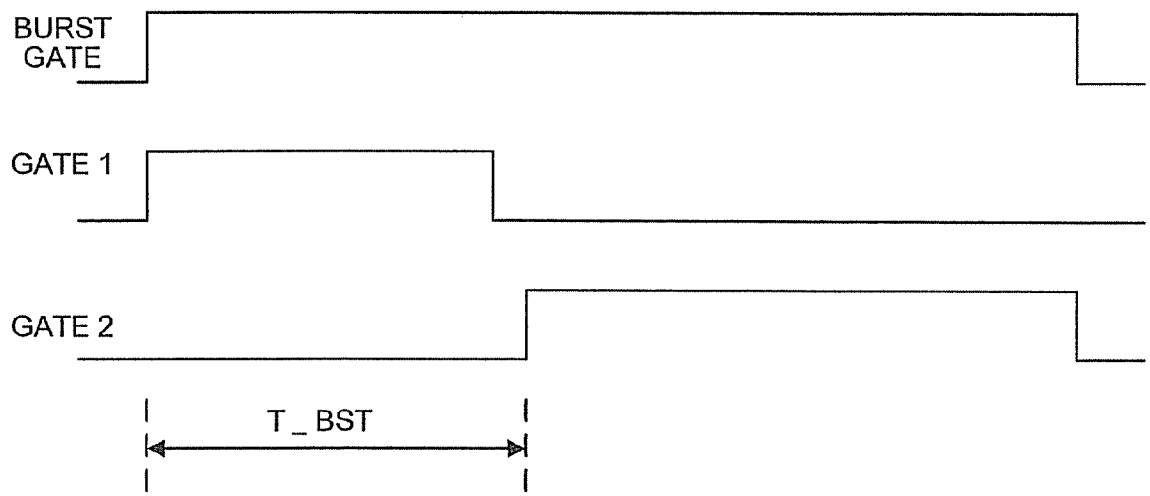
FIG. 22 is an explanatory view that shows a state of a rising delay time of a divided gate in comparison with a burst gate.

FIG. 22 is an explanatory view that shows a state of a rising delay time of a divided gate 2 in comparison with a burst gate. In the present embodiment, the gate switching unit 2121 of the position-speed detection unit 2120 is designed so that, upon positioning control of the magnetic head, the burst gate is not divided, while, upon seeking operation of the magnetic head, the burst gate is divided into a gate 1 and a gate 2, so that the delay time T_BST for rising of the gate 2 is changed depending on the target speed of the magnetic head. More specifically, the controlling operation is carried out so that, as the target speed of the magnetic head becomes faster, the delay time T_BST for rising is made shorter. After the delay time T_BST for rising has been changed, the shifting speed detecting process of the magnetic head is carried out in the same manner as the speed detecting process of the fifth embodiment.

The speed of the magnetic head during the seeking operation to be detected is calculated by the weighted average between the speed found by using the above-mentioned divided gates and the speed obtained based upon the position difference between sectors. In this case, the weighting coefficient is set to a value that allows the speed detected based upon the position difference between sectors to be used more preferentially, as the target speed of the magnetic head during the seeking operation becomes greater, and is also set to a value that allows the speed detected by using the divided gates to be more preferentially used, at the time of a low-speed seeking operation as well as in the settling state.

As described above, in the magnetic recording/reproducing apparatus of the sixth embodiment, switching processes are carried out in such a manner that during the positioning process of the magnetic head on the track, the burst gate is not divided, and that during a seeking operation that allows the magnetic head to shift between tracks, the burst gate is divided into two sections; thus, the delay time T_BST for rising of the gate 2 is adjusted in accordance with the target speed of the magnetic head so that it becomes possible to detect the position of the magnetic head with high precision during the positioning process of the magnetic head, and also to carry out the speed detection with high precision during a high-speed seeking operation of the magnetic head between tracks.

Figure 23:
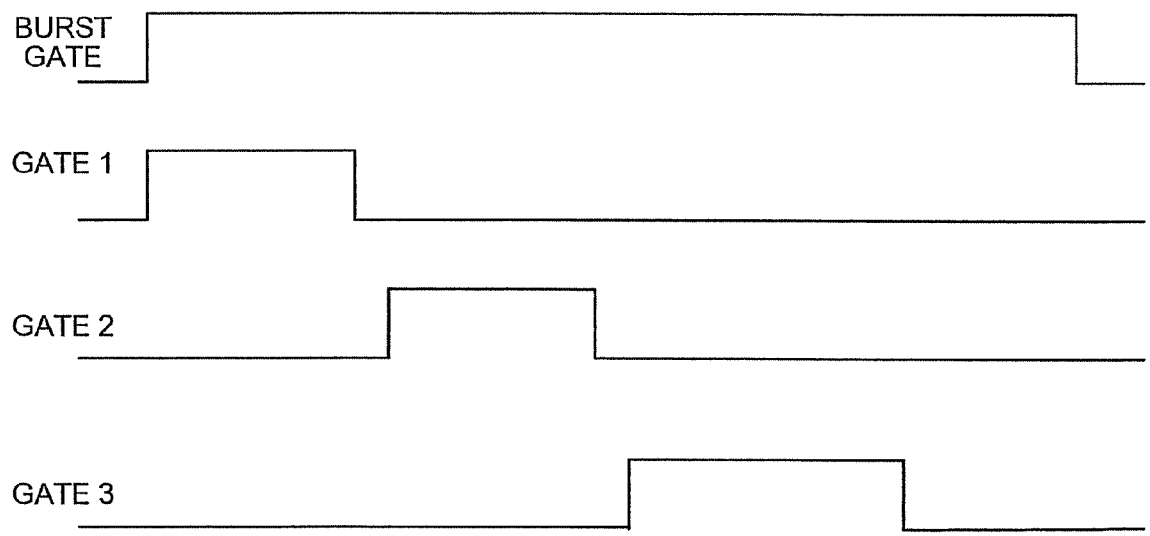
FIG. 23 is an explanatory view that shows an example in which the number of divisions of the burst gate is increased in response to a target speed of a magnetic head.

In the present embodiment, during the seeking operation of the magnetic head, the delay time T_BST for rising is adjusted in accordance with the target speed of the magnetic head, with the burst gate being divided into two sections, and in addition to this arrangement, an arrangement in which the number of divisions of the burst gate is adjusted by the gate switching unit 2121 in accordance with the target speed of the magnetic head may be used. FIG. 23 is an explanatory view that shows an example in which the number of divisions of the burst gate is increased in response to the target speed of a magnetic head. More specifically, the gate switching unit 2121 carries out adjustments so that the number of divisions is increased as the target speed of the magnetic head becomes faster.

A seventh embodiment according to the present invention will be explained below.

In the magnetic recording/reproducing apparatus 1800 according to the fifth embodiment, the shifting speed in the radial direction of the magnetic head is detected based upon position deviation information PES1, PES2 of the respective divided gates obtained from a phase difference found by the reproduced signal of the burst area 113 and the delay time T_BST for rising; however, this method tends to have errors in detecting the speed.

For this reason, in the magnetic recording/reproducing apparatus according to the seventh embodiment, the shifting speed in the radial direction of the magnetic head is detected by taking conversion of the amplitude value of the reproduced signal from the burst area 113 into consideration.

In the same manner as the first embodiment, the magnetic recording medium of the present embodiment has a structure in which a plurality of magnetic sections 301 of the burst area 113 are formed by a single burst recording pattern that tilts to the preamble recording pattern, and the track width of the servo-area is formed with the same width as the track width of the data area. Here, the magnetic recording medium of the second embodiment may be used for a magnetic recording/reproducing apparatus of the present embodiment.

Here, the structures of the burst-area reproducing circuit and the position-speed detection unit of the magnetic recording/reproducing apparatus of the present embodiment are the same as those of the fifth embodiment.

The phase difference cosine value C indicated by equation (8) and the phase difference sine value S indicated by equation (9) commonly include an amplitude G0. Therefore, as indicated by the following equation (20), information that includes only the amplitude value is obtained from the phase difference cosine value C and the phase difference sine value S.

$$G=\sqrt{C^2+S^2}=2\sqrt{2}*G0 \qquad (20)$$

In the magnetic recording medium to be used in the present embodiment, since a plurality of magnetic sections 301 in the burst area 113 are formed by a single burst recording pattern that tilts to the preamble recording pattern, the amplitude is normally maintained in a constant level even when, on the same track, the relative distance from the track center is changed, with only the phase of the clock of the reproducing signal obtained from the burst area being changed.

However, in the case when the magnetic head is shifted between tracks so that the seeking speed increases, the amplitude of the reproduced signal from the burst area is changed. Such a change in the amplitude depends on the tilt angle of the magnetic sections 301; however, in the tilted burst recording pattern of the magnetic sections 301 as shown in FIG. 2, when the magnetic head is shifting toward the center of the recording medium, that is, upward in FIG. 2, the signal amplitude tends to reduce, and, in contrast, when the magnetic head is shifting outward of the recording medium from the center of the recording medium, that is, downward in FIG. 2, the signal amplitude tends to increase.

Accordingly, in the magnetic recording/reproducing apparatus of the present embodiment, the speed detection is preferentially carried out based upon equation (19) in the speed detection unit 1822 of the position-speed detection unit 1820, and upon occurrence of an erroneous detection of speed, by using the phase difference cosine value C and the phase difference sine value S inputted from the phase detection unit 410 based upon equation (20), amplitude information G including an amplitude G0 is calculated so that the shifting speed of the magnetic head is found.

Here, in the case when the magnetic head is carrying out a high-speed seeking operation, the amplitude value G0 fluctuates and the frequency also varies. For this reason, when the magnetic head is shifting outward from the center of the magnetic medium, the amplitude value G0 monotonously increases, with the two factors having a non-linear relationship; therefore, the amplitude information G and the shifting speed of the magnetic head are preliminarily measured so that a speed-amplitude conversion function, which indicates a relationship between the shifting speed and the amplitude information G, is found, and based upon the amplitude information G and the speed-amplitude conversion function, the shifting speed of the magnetic head is detected.

As described above, in the magnetic recording/reproducing apparatus according to the seventh embodiment, in addition to the detection of the shifting speed of the magnetic head based upon position deviation information PES1, PES2 of the respective divided gates obtained from a phase difference and the delay time T_BST for rising, in the event of an error in the speed detection, the shifting speed in the radial direction of the magnetic head is detected based upon a change in the amplitude value of the reproduced signal from the burst area 113; therefore, it becomes possible to detect the shifting speed of the magnetic head with higher precision.

An eighth embodiment according to the present invention will explained below.

In the magnetic recording/reproducing apparatus according to the eighth embodiment, the shifting speed of the magnetic head is detected based upon a frequency fluctuation in the reproduced signal from a burst area occurring at the time of a high-speed seeking operation of the magnetic head.

In the same manner as the first embodiment, the magnetic recording medium of the present embodiment has a structure in which a plurality of magnetic sections 301 of the burst area 113 are formed by a single burst recording pattern that tilts to the preamble recording pattern, and the track width of the servo-area is formed with the same width as the track width of the data area. Here, the magnetic recording medium of the second embodiment may be used for a magnetic recording/reproducing apparatus of the present embodiment.

Strictly speaking, the frequency fluctuation that occurs when the magnetic head is carrying out a high-speed seeking operation appears as an error in orthogonal wave detection, and gives adverse effects to the phase detection and amplitude detection, resulting in a non-linear distortion in the detection results. In the magnetic recording medium of the present embodiment, in the case of a seeking operation in which the magnetic head is shifted toward the center of the recording medium, the frequency is lowered, while, in the case of a seeking operation in which the magnetic head is shifted outward from the center of the recording medium, the frequency is increased. Since this frequency fluctuation and the shifting speed in the radial direction of the magnetic head mutually have a linear relationship, the magnetic recording/reproducing apparatus of the present embodiment detects the shifting speed of the magnetic head by detecting the frequency fluctuation so that the shifting speed in the radial direction of the magnetic head is detected with high precision even during a high-speed seeking operation.

Figure 24:
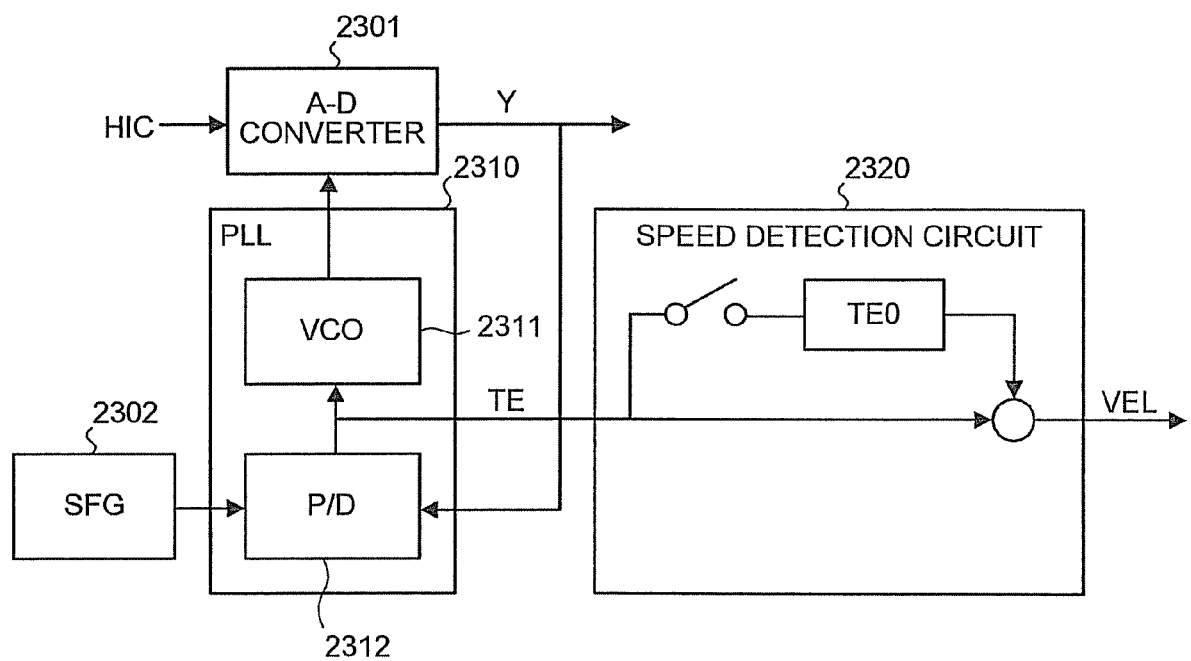
FIG. 24 is a block diagram that shows a structure of a magnetic recording/reproducing apparatus according to an eighth embodiment.

FIG. 24 is a block diagram that shows a structure of a magnetic recording/reproducing apparatus according to the eighth embodiment. FIG. 24 shows only the circuit that is used for detecting the shifting speed of the magnetic head in the magnetic recording/reproducing apparatus of the present embodiment. Here, during the detecting operation of the speed of the magnetic head, the detection of position deviation information from the reproduced signal in the burst area 113 is not available; however, position information, found from the address area 112, may be used so that no problems are raised when the magnetic head is carrying out a high-speed seeking operation.

As shown in FIG. 24, the structure to be used for the speed detection in the magnetic recording/reproducing apparatus according to the eighth embodiment includes an A-D (Analog-Digital) converter 2301, a PLL (Phase-Locked Loop) circuit 2310, an SFG (Servo Frequency Generator) circuit 2302 and a speed detection circuit 2302. Here, all the A-D converter 2301, the PLL circuit 2310 and the SFG circuit 2302 commonly utilize circuits used for reproduced signal processing in the preamble area.

The A-D converter 2301 converts the burst reproduced signal that is a reproduced signal from the burst area 113 that is inputted from a head amplifier IC (HIC) through a CTF (not shown) to a digital signal in synchronized timing with a synchronous clock outputted from the PLL circuit 2310.

The SFG circuit 2302 generates a servo reference clock. The PLL circuit 2310 phase-adjusts the servo reference clock generated by the SFG circuit 2302 to generate a reproducing clock that has a frequency that is N times the frequency of the burst reproduced signal detected by the A-D converter 2301 with a phase coincident therewith; thus, the sample timing in the A-D converter 2301 is adjusted.

In other words, as explained in the first embodiment, in the reproduced signal processing in the burst area 113, the sampling timing of the burst reproduced signal is synchronized with the timing determined in the reproduced signal processing in the preamble area 111, and in the case when the center of the magnetic head is coincident with the track center, the phase of the reproduced signal is set to 0 so that a sampling process is carried out in such timing as shown in FIG. 5A.

In the present embodiment, upon detection of the shifting speed of the magnetic head, a reproduced clock, which is frequency- and phase-adjusted so as to be synchronized with the burst reproduced signal by the PLL circuit 2301, is generated so that a synchronizing process for carrying out a feed-back control so as to adjust the sampling timing shown in FIG. 5A to a timing as shown in FIG. 5B is carried out.

As shown in FIG. 24, the PLL circuit 2310 is provided with a P/D (Phase Detector: phase comparator) 2312 and a VCO (Voltage Controlled Oscillator) 2311.

The P/D 2312 detects a timing error (TE) between a servo reference clock (actually, clock obtained by preliminarily N-frequency dividing the reference clock) and a data row of a sample value Y sampled by the A-D converter 2301.

The VCO2311 adjusts the transmission frequency by the timing error (TE) detected by the P/D 2312 so that the data row of the sample value Y of the burst reproduced signal is sampled at the timing as shown in FIG. 5-2. The timing error (TE) includes a phase error and a frequency error in a mixed manner at first, and by using the timing error (TE), the transmission frequency of the VCO 2311 is adjusted so that a feed-back controlling operation is carried out by the PLL circuit 2310 until the data row of the sample value Y outputted from the A-D converter 2301 has been sampled at the timing as shown in FIG. 5B.

The controlling operation of the PLL circuit 2310 thus carried out determines the sampling timing of the burst reproduced signal so that the synchronizing process is completed, with the timing error (TE) being set to a fixed value corresponding only to a frequency compensated amount to the frequency obtained by N-frequency dividing the servo reference clock, and the resulting frequency is outputted to the speed detection circuit 2320.

The speed detection circuit 2320 holds the initial timing error (TE0) after the reproduced signal processing of the preamble area 111. The initial timing error (TE0), which is derived from the timing error (TE), inputted from the PLL circuit 2310 at the time when, upon detecting the shifting speed of the magnetic head, the magnetic head has been shifted to the burst area to allow the burst gate to rise, and retained therein, corresponds to a timing error immediately after the completion of the synchronizing process of the preamble reproduced signal.

The speed detection circuit 2320 compares a timing error (TE) inputted from the PLL circuit 2310, that is, the timing error (TE) after the completion of the burst reproduced signal synchronization, with the initial timing error (TE0) so that, a difference value as a result of the comparison forms a frequency fluctuation amount that is proportional to the frequency error of the preamble area and the burst area, and based upon such a frequency fluctuation amount, the shifting speed VEL of the magnetic head is outputted.

Upon detecting the shifting speed of the magnetic head, at the time when the magnetic head has been shifted to the burst area 113 to allow the burst gate to rise, a timing error (TE) is inputted to the speed detection circuit 2320 from the PLL circuit 2310, and this timing error (TE) is retained in the speed detection circuit 2320 as the initial timing error.

During the burst gate interval, a synchronization drawing process of the burst reproduced signal is executed by the PLL circuit 2310. When the burst gate is allowed to fall so that the sampling timing of the burst reproduced signal has been determined, the timing error (TE) at this point of time is inputted to the speed detection circuit 2320 from the PLL circuit 2310 so that the speed detection circuit 2320 calculates a frequency fluctuation amount as a difference value between the inputted timing error and the initial timing error, and the shifting speed VEL of the magnetic head corresponding to the frequency fluctuation amount is outputted.

In this manner, in the magnetic recording/reproducing apparatus according to the eighth embodiment, the frequency fluctuation in the preamble area and the burst area is detected so as to find the shifting speed of the magnetic head; therefore, even when the magnetic head is carrying out a high-speed seeking operation, the shifting speed in the radial direction of the magnetic head can be detected with high precision.

With respect to the method of detecting the frequency, not limited to the processes adopted by the embodiments, any known method may be used. Moreover, by using a band-pass filter, the frequency fluctuation may be converted to an amplitude fluctuation, and based upon the converted amplitude, the shifting speed of the magnetic head may be detected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording/reproducing apparatus comprising:
   a reproducing unit that performs a reproducing process on a magnetic recording medium that includes a servo area where servo data used for detecting a position of a magnetic head on the magnetic recording medium is recorded, and a writable data area, arranged side by side with the servo area in the track direction, on which user data is written by the magnetic head, the servo area including a preamble area where a preamble recording pattern that represents data used for providing a clock synchronization of the servo data is formed by a plurality of magnetic sections, and a burst area where data used for detecting a relative position of the magnetic head with respect to a track center position of the servo data is recorded and on which a single burst recording pattern which is a layout pattern that tilts to the preamble recording pattern with a predetermined tilt angle is formed by a plurality of magnetic sections,
   the reproducing unit including
      a phase detection unit that detects a phase difference of a burst reproduced signal of the burst area from a reproduced signal of the preamble area, based upon sample values at respective points in the preamble area, which are sampled by using a synchronous clock determined by a reproduced signal processing of the preamble area and a plurality of predetermined coefficients, as phase difference information corresponding to a plurality of phase differences, the phase detection unit including
         a filter circuit to which the sample values at the respective points are inputted and which outputs output values obtained by multiplying each of the inputted sample values by a plurality of different coefficients and adding resulting values; and
         an integrator that integrates the output values output from the filter circuit for respective divided gate intervals into which a burst gate interval corresponding to a reproducing process interval for the burst area is divided, and outputs resulting values as the phase difference information,
      wherein the filter circuit calculates the output values by multiplying the sample value by one of the coefficients in a manner so as to sequentially cycle the coefficients each time the sample value at each of the points is inputted and outputs the calculated output values; and a position detection unit that detects position deviation information indicating a relative distance of the magnetic head from the track center position based upon the phase difference information.

2. The magnetic recording/reproducing apparatus according to claim 1, wherein the phase detection unit includes an inner product calculation unit that calculates a plurality of inner product values by multiplying the sample values at the respective points by the respective coefficients;

an integrating unit that integrates the respective inner product values during a burst gate interval corresponding to a reproducing process interval for the burst area; and a dividing unit that divides the integrated inner values mutually to find a plurality of divided values, and outputs resulting a plurality of the divided values as the phase difference information.

3. The magnetic recording/reproducing apparatus according to claim 2, wherein the inner product calculation unit includes a first inner product calculation unit that calculates a first inner product value obtained by multiplying the sample value at each of the points by a sine wave value serving as the coefficient;

a second inner product calculation unit that calculates a second inner product value obtained by multiplying the sample value at each of the points by a cosine wave value serving as the coefficient; and a third inner product calculation unit that calculates a third inner product value obtained by multiplying the sample value at each of the points by a sine wave value having a phase difference of 180 degrees serving as the coefficient, the integrating unit includes a first integrator that integrates the first inner product value;

a second integrator that integrates the second inner product value; and a third integrator that integrates the third inner product value, and the dividing unit includes a first divider that divides the integrated second inner product value by the integrated first inner product value to find a first divided value, and outputs resulting the first divided value as the phase information; and a second divider that divides the integrated third inner product value by the integrated second inner product value to find a second divided value, and outputs resulting the second divided value as the phase difference information.

4. The magnetic recording/reproducing apparatus according to claim 1, further comprising a speed detection unit that detects a shifting speed in a radial direction of the magnetic head of the magnetic recording medium, wherein the phase detection unit detects the phase difference information relating to the burst reproducing signal based upon the sample value at each of the points sampled from the burst reproduced signal at a synchronous clock determined by the reproduced signal processing in the preamble area and a plurality of predetermined coefficients, for respective divided gate intervals into which a burst gate interval corresponding to a reproducing process interval for the burst area is divided, the position detection unit detects deviation information of the magnetic head center from the track center position for each of the divided gate intervals, based upon the phase difference information for each of the divided gates, and detects the position deviation information in the burst gate interval based upon the deviation information for each of the divided gate intervals, and the speed detection unit detects the shifting speed based upon the deviation information for each of the divided gates and a delay time for rising of the divided gate.

5. The magnetic recording/reproducing apparatus according to claim 4, further comprising a gate switching unit that controls one of a delay time for rising of the divided gate and a number of divisions of the burst gate based upon the shifting speed in the radial direction of the magnetic head.

6. The magnetic recording/reproducing apparatus according to claim 4, wherein the speed detection unit further detects an amplified value of the burst reproduced signal based upon the phase difference information, and detects the shifting speed in the radial direction based upon the amplified value.

7. The magnetic recording/reproducing apparatus according to claim 1, further comprising a speed detection unit that detects a frequency fluctuation with respect to the reproduced signal of the preamble area of the burst reproduced signal, and detects a shifting speed of the magnetic head in a radial direction of the magnetic recording medium based upon the detected frequency fluctuation.

* * * * *